US009648337B2

(12) United States Patent
Koyama et al.

(10) Patent No.: US 9,648,337 B2
(45) Date of Patent: *May 9, 2017

(54) VIDEO IMAGE ENCODING DEVICE AND VIDEO IMAGE ENCODING METHOD

(71) Applicant: FUJITSU LIMITED, Kawasaki-shi, Kanagawa (JP)

(72) Inventors: Junpei Koyama, Shibuya (JP); Kimihiko Kazui, Kawasaki (JP); Satoshi Shimada, Kawasaki (JP); Akira Nakagawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/956,772

(22) Filed: Dec. 2, 2015

(65) Prior Publication Data
US 2016/0088307 A1    Mar. 24, 2016

Related U.S. Application Data

(62) Division of application No. 13/860,132, filed on Apr. 10, 2013, now Pat. No. 9,237,342.

(30) Foreign Application Priority Data

Apr. 27, 2012  (JP) ................................ 2012-104005

(51) Int. Cl.
*H04N 19/423* (2014.01)
*H04N 19/44* (2014.01)
(Continued)

(52) U.S. Cl.
CPC ......... *H04N 19/423* (2014.11); *H04N 19/124* (2014.11); *H04N 19/152* (2014.11);
(Continued)

(58) Field of Classification Search
CPC ........... H04N 19/00279; H04N 19/124; H04N 19/149; H04N 19/115
(Continued)

(56) References Cited

U.S. PATENT DOCUMENTS 6,658,157 B1   12/2003  Satoh et al.
2003/0058224 A1   3/2003  Ushimaru
(Continued)

FOREIGN PATENT DOCUMENTS

JP   8-163559    6/1996
JP   2003-92761  3/2003
(Continued)

OTHER PUBLICATIONS

Patent Abstracts of Japan, Publication No. 8-163559, published Jun. 21, 1996.
(Continued)

*Primary Examiner* — Hee-Yong Kim
(74) *Attorney, Agent, or Firm* — Staas & Halsey LLP

(57) ABSTRACT

A method includes determining a group to which each of a plurality of blocks belongs, the plurality of blocks being obtained by dividing each picture included in video image data; adding, to an output stream, group information expressing the group to which each of the plurality of blocks belongs; calculating an output time for each of the groups; determining output delay for each of the groups; adding, to the output stream, an output delay time from a decode time of each of the groups; controlling an encode amount so that data used for outputting all of the blocks included in one of the groups arrives at a decoding buffer of a decoding device and decoding is completed by an output time expressed by the output delay time; and performing encoding based on the encode amount that has been controlled.

2 Claims, 23 Drawing Sheets

(51) Int. Cl.
| | |
|---|---|
| *H04N 19/176* | (2014.01) |
| *H04N 7/12* | (2006.01) |
| *G06K 9/36* | (2006.01) |
| *H04N 19/124* | (2014.01) |
| *H04N 19/152* | (2014.01) |
| *H04N 19/149* | (2014.01) |
| *H04N 19/115* | (2014.01) |

(52) U.S. Cl.
CPC ........... *H04N 19/176* (2014.11); *H04N 19/44* (2014.11); *H04N 19/115* (2014.11); *H04N 19/149* (2014.11)

(58) Field of Classification Search
USPC .................................................... 375/240.24
See application file for complete search history.

(56) References Cited

U.S. PATENT DOCUMENTS

| | | | |
|---|---|---|---|
| 2004/0091245 A1* | 5/2004 | Yamasaki | H04N 21/44028 386/279 |
| 2009/0310670 A1 | 12/2009 | Odagawa et al. | |
| 2010/0246662 A1 | 9/2010 | Koto et al. | |
| 2013/0202050 A1 | 8/2013 | Koto et al. | |

FOREIGN PATENT DOCUMENTS

| | | |
|---|---|---|
| JP | 2003-179938 | 6/2003 |
| JP | 2010-232720 | 10/2010 |

OTHER PUBLICATIONS

Japanese Office Action dated May 17, 2016 in corresponding Japanese Patent Application No. 2012-104005.
Patent Abstracts of Japan, Publication No. 2003-179938, Published Jun. 27, 2003.
Benjamin Bross et at., "High efficiency video coding (HEVC) text specification draft 6", *Joint Collaborative Team on Video Coding (JCT-VC) of ITU-T SG16 WP3 and ISO/IEC JTC1/SC29/WG11*, Feb. 1-10, 2012, pp. 1-249.
*Test Model 5, International Organisation for Standardisation, Coded Representation of Picture and Audio Information, ISO-IEC/JTC1/SC29/WG11/N0400*, Document AVC-491b, Version 2, Apr. 7, 1993, pp. 1-119.
U.S. Appl. No. 13/860,132, filed Apr. 10, 2013, Junpei Koyama, Fujitsu Limited.
Patent Abstracts of Japan, Publication No. 2010-232720, Published Oct. 14, 2010.
Japanese Office Action dated Feb. 9, 2016 in corresponding Japanese Patent Application No. 2012-104005.
Patent Abstracts of Japan, Publication No. 2003-92761 published Mar. 28, 2003.
Japanese Office Action dated Oct. 18, 2016 in corresponding Japanese Patent Application No. 2012-104005.

* cited by examiner

VIDEO IMAGE ENCODING DEVICE AND VIDEO IMAGE ENCODING METHOD

CROSS-REFERENCE TO RELATED APPLICATIONS

This application is a divisional of U.S. patent application Ser. No. 13/860,132 filed on Apr. 10, 2013, which is based upon and claims the benefit of priority of the prior Japanese Patent Application No. 2012-104005 filed on Apr. 27, 2012, the entire contents of which are incorporated herein by reference.

FIELD

The embodiments discussed herein are related to a video image encoding device, a video image encoding method, a video image decoding device, and a video image decoding method, for dividing a picture included in video image data into plural blocks and encoding each block.

BACKGROUND

Generally, video image data includes a large amount of data. Thus, a device for handling video image data compresses the video image data by encoding the video image data, when sending the video image data to another device or when storing the video image data in a storage device.

As a representative standard technology for encoding video images, MPEG (Moving Picture Experts Group phase)-2, MPEG-4, or MPEG-4 AVC/H.264 (H.264 MPEG-4 Advanced Video Coding) developed at ISO/IEC (International Standardization Organization/International Electrotechnical Commission) is widely used.

As standard encoding technologies described above, there is an inter encoding method for encoding a picture by using information of the picture that is the encoding target and information of pictures before and after the encoding target, and an intra encoding method for encoding a picture by using only information of the picture that is the encoding target.

Generally, the encoding amount of pictures or blocks that have been encoded by the inter encoding method is smaller than the encoding amount of pictures or blocks that have been encoded by the intra encoding method. Therefore, according to the selected encoding mode, the encoding amount of pictures becomes disproportionate within the same sequence. Similarly, according to the selected encoding mode, the encoding amount of blocks becomes disproportionate within the same picture.

Therefore, in order to transmit a data stream including encoded video images by a constant transmission rate even if the encoding amount varies over time, the transmission source device is provided with a transmitting buffer for a data stream, and the transmission destination device is provided with a receiving buffer for a data stream.

A delay caused by these buffers (hereinafter, "buffer delay") is the main factor causing a delay from when each picture is input in the encoding device until each picture is displayed in a decoding device (hereinafter "codec delay"). As the codec delay, there is decoding delay that is a delay relevant to decoding, and display delay that is a delay relevant to display (output).

By reducing the size of the buffer, the buffer delay and the codec delay are reduced. However, as the size of the buffer decreases, the degree in freedom in allocating the encoding amount for each picture decreases. Consequently, the image quality of a reproduced video image is deteriorated. The degree in freedom in allocating the encoding amount means the extent of variation in the encoding amount.

MPEG-2 and MPEG-4 AVC/H.264 respectively specify VBV (Video Buffering Verifier) and CPB (Coded Picture Buffer), which are operations of a receiving buffer in an ideal decoding device.

A video image encoding device controls the encoding amount so that the receiving buffer of an ideal decoding device does not overflow or underflow. An ideal decoding device is specified to perform instantaneous decoding, where the time taken for a decoding process is zero. For example, there is a technology for controlling a video image encoding device relevant to VBV (see, for example, Patent Document 1).

The video image encoding device controls the encoding amount to ensure that data of a picture to be decoded is stored in the receiving buffer at the time when the ideal decoding device decodes the picture, so that the receiving buffer of the ideal decoding device does not overflow or underflow.

The receiving buffer underflows when the video image encoding device transmits a stream by a constant transmission rate, but transmission of data used for decoding the picture is not completed until the time when the video image decoding device decodes and displays the pictures, because there is a large encoding amount for each picture. That is to say, underflow of the receiving buffer means that data used for decoding a picture is not present in the receiving buffer of the decoding device. In this case, it is not possible for the video image decoding device to perform a decoding process, and therefore frame skip occurs.

In order to perform a decoding process without causing the receiving buffer to underflow, the video image decoding device displays a picture after delaying a stream by a predetermined length of time from the receiving time.

As described above, an ideal decoding device is specified so that the decoding process is instantaneously completed by a processing time of zero. Therefore, assuming that the time of inputting an "i" th picture (hereinafter, also expressed as "P(i)") in the video image encoding device is t(i) and the time of decoding P(i) in the ideal decoding device is dt(i), it is possible to display this picture at the same time as the decode time, i.e., at dt(i).

For all pictures, the display time period of the picture {t(i+1)−t(i)} and {dt(i+1)−dt(i)} are equal, and therefore the decode time dt(i) becomes {dt(i)=t(i)+dly}, which is delayed by a fixed time dly from the input time t(i). Accordingly, the video image encoding device has to complete transmitting data used for decoding to the receiving buffer of the video image decoding device until the time dt(i).

FIG. 1 illustrates an example of the transition of the buffer occupancy amount of the receiving buffer according to the conventional technology. In the example of FIG. 1, the horizontal axis indicates the time and the vertical axis indicates the buffer occupancy amount of the receiving buffer. A line 10 indicated by a solid line indicates the buffer occupancy amount at each time point.

In the receiving buffer, the buffer occupancy amount is recovered at a predetermined transmission rate, and data used for decoding a picture at the decode time of each picture is extracted from the buffer. In the example of FIG. 1, data of P(i) starts to be input to the receiving buffer at a time at(i), and the last data of the P(i) is input at a time ft(i). The ideal decoding device completes decoding P(i) at a time dt(i), and it is possible to display P(i) at the time dt(i).

The ideal decoding device performs instantaneous decoding, while an actual video image decoding device takes a predetermined length of time to perform a decoding process. Generally, the decoding process time for one picture is shorter than the display period of a picture; however, the actual video image decoding device takes an amount of time close to the display period of a picture for performing the decoding process.

The data of P(i) is input to the receiving buffer from the time at(i) to the time ft(i). However, the time at which data used for decoding each block arrives between at(i) and ft(i) is not ensured. Therefore, the actual video image decoding device starts the process of decoding P(i) from the time ft(i). Accordingly, assuming that the maximum processing time to be taken for decoding one picture is ct, it is only possible to ensure that the actual video image decoding device completes the decoding process within the time ft(i)+ct.

The video image encoding device ensures that data used for decoding P(i) arrives at the receiving buffer until the time dt(i), i.e., it is ensured that ft(i)≤dt(i) is satisfied. Thus, when ft(i) is at the latest time, ft(i) becomes the same as dt(i).

In this case, the time at which completion of the decoding process of the entire P(i) is ensured is dt(i)+ct. To display all pictures at equal intervals, the video image decoding device is to delay the display times of the respective pictures by at least a time ct with respect to the ideal decoding device.

In VBV of MPEG-2 and CPB of MPEG-4 AVC/H.264, the difference between the arrival time of each encoded picture in the video image decoding device and the display time of each encoded picture that has been decoded is expressed as (ft(i)−at(i)+ct). That is to say, it is difficult to achieve a codec delay of less than the time ct, where the codec delay extends from when each picture is input to the encoding device to when the picture is output at the decoding device. That is to say, the time ct is usually the processing time for one picture, and therefore it is difficult to achieve a codec delay of less than the processing time for one picture.

Patent Document 1: Japanese Laid-Open Patent Publication No. 2003-179938

Non-patent Document 1: JCTVC-H1003, "High-Efficiency Video Coding (HEVC) text specification draft 6", Joint Collaborative Team on Video Coding of ITU-T SG16 WP3 and ISO/IEC JTC1/SC29/WG11, February 2012

Non-patent Document 2: MPEG-2 Test Model 5. April 1993.ISO-IEC/JTC1/SC29/WG11/N0400 (http://www.mpeg.org/MPEG/MSSG/tm5/)

In the conventional technology, it is difficult to make a codec delay become the processing time for one picture. However, there is the following method for making the codec delay become less than the processing time for one picture. For example, this method is for assigning each block in a picture to one of an N number of groups, and assigning a decode start time to each group. A group is, for example, one block line. A block line expresses a line of blocks in the horizontal direction of the picture.

If the amount of information generated in each group is made uniform, the difference in the decode start time of continuous groups matches the processing time for each group, and the time ct becomes the processing time ct/N of each group. Thus, as a result, it is possible to decrease the codec delay to the processing time for each group.

FIG. 2 illustrates an example where the codec delay is made to be less than one picture time by group division. A graph line 17 in FIG. 2 expresses the time transition of the buffer occupancy amount of the conventional method.

Meanwhile, a graph line 15 in FIG. 2 expresses the time transition of the buffer occupancy amount according to group division.

According to the group division method, the decode start time dgt(i, n) of the "n" th group of P(i) (hereinafter, also expressed as G(i, n)) is defined, and the buffer occupancy amount is decreased. Each group is decoded by taking the group decode time ct/N indicated by the reference numeral 16 starting from the corresponding decode start time. Therefore, the delay in the display possible time (the time during which display is possible) of each group is reduced.

In the group division method, the amount of information generated in each group is substantially equal, and therefore the codec delay is reduced to the time per group. Codec delay is the maximum value in a case where the information generation amount in each block in the group is significantly disproportionate. However, under actual circumstances, the disproportion in the generated information amount in each block in the group is reduced by appropriate rate control. In this case, it is theoretically possible to further reduce the code delay, but this is difficult to achieve by the block division method. The reason for this is described with reference to FIGS. 3 through 6.

FIG. 3 illustrates operations of a receiving buffer of the video image decoding device. In the example of FIG. 3, the cumulative value of the amount of encoded data arriving at the receiving buffer, and the cumulative value of the encoded data consumed by a decoding process are used to express the operations of a receiving buffer.

A graph line 20 in FIG. 3 expresses the cumulative value of the amount of encoded data arriving at the receiving buffer. The encoded data is transmitted from the video image encoding device to the video image decoding device by a fixed rate R. In the example of FIG. 3, the first bit arrives at the receiving buffer of the video image decoding device at a time "at(0)", which is zero.

A graph line 21 in FIG. 3 expresses the cumulative value of encoded data consumed by an instantaneous decoding process in units of pictures. After the initial delay dly, the "i" th picture P(i) (i=0, . . . ) is sequentially subjected to instantaneous decoding at dt(i). The difference dt(i+1)−dt(i) in the instantaneous decode time between two continuous pictures is fixed. The encoding information amount of P(i) is expressed by b(i).

at(i) and ft(i) express the time at which the first bit in the encoded data of P(i) and the last bit in the encoded data of P(i) arrive at the video image decoding device, respectively. In order to prevent the receiving buffer of the video image decoding device from underflowing, all encoded data of P(i) is to arrive at dt(i). That is to say, dt(i)≥ft(i) and dt(i−1)≥at(i) are to be satisfied.

The capacity of the receiving buffer at each time corresponds to the difference between the graph line 20 and the graph line 21 at each time. For example, the capacity of the receiving buffer after instantaneous decoding of P(0) at time dt(0) is the bit amount indicated by a reference numeral 25.

FIG. 4 illustrates the operation of the receiving buffer focusing on one P(i). FIG. 4 is illustrated by enlarging part of FIG. 3. Particularly, the example of FIG. 4 illustrates a case where instantaneous decoding is performed in units of pictures, the receiving buffer of the video image decoding device does not underflow, and at(i) and ft(i) are the latest times, i.e., dt(i)=ft(i) and dt(i−1)=at(i). In the example of FIG. 4, the number of groups N is 4, and the number of blocks and the generated information amount of each of the groups dgt(i,n+1)−dgt(i,n) is uniform.

A graph line 30 in FIG. 4 expresses the cumulative value of the amount of encoded data arriving at the receiving buffer of the video image decoding device. A graph line 31 expresses the cumulative value of the encoded data consumed by instantaneous decoding in units of pictures.

A graph line 32 expresses the cumulative value of the encoded data consumed by instantaneous decoding in the "n" th group G(i,n) of P(i) at dgt(i,n).

In the group division method, it is assumed that the amounts of generated information in the respective groups are averaged in the picture. That is to say, the total sum of the amounts of generated information in the blocks in the groups of P(i) is b(i)/N. b(i) is the amount of generated information in P(i).

The minimum value of the amount of generated information in the blocks in the groups of P(i) is zero, and the maximum value is b(i)/N. In a case where the blocks in P(i) are instantaneously decoded at equal intervals from dt(i−1) to dt(i), a graph line f(t) expressing the cumulative value of the consumed encoded data is present inside square areas indicated by reference numerals 35 through 38.

When the amounts of generated information in the blocks are equal, f(t) is a straight line (matching graph line 30) joining the bottom left vertex and the top right vertex of each of the square areas indicated by reference numerals 35 through 38. When a bit amount of the entire group is generated at the leading block, f(t) is a line connecting the left edge and the top edge of each of the square areas. The latter case corresponds to the maximum delay in terms of buffer delay.

In the example of FIG. 4, between the times of dt(i−1) to dt(i), the bits of the blocks in P(i) arrive at the receiving buffer. The arrival time g(x) of the "x" th bit (x=[1,b(i)]) is expressed by the following formula.

$$g(x) = dt(i-1) + (dt(i) - dt(i-1)) * \left(\frac{x}{b(i)}\right) \quad \text{Formula 1}$$

In view of the operations of an actual video image decoding device, a case where the blocks in P(i) are instantaneously decoded at equal intervals from dt(i−1) to dt(i) is considered. Assuming that the total number of blocks in the picture is M, the ideal instantaneous decode time p(i,m) of the "m" th block in P(i) is expressed by the following formula.

$$p(i,m) = dt(i-1) + (dt(i) = dt(i-1)) * \left(\frac{m}{M}\right) \quad \text{Formula 2}$$

Depending on the shape of f(t), f(t) may be above the graph line 30. That is to say, f(p(i,m))<g(f(p(i,m))) is satisfied, and all bits used for decoding the block do not reach the receiving buffer of the video image decoding device, and underflow occurs. When the blocks have an equal number of bits, f(p(i,m))=g(f(p(i,m))) is satisfied and underflow does not occur, but this is the worst case in terms of buffer delay.

When a bit amount of the entire group is generated at the leading block, the arrival time of all bits used for decoding the leading block is delayed by dgt(i,n+1)−dtg(i,n).

In the group division method, the shape of f(t) is not known to the video image decoding device. Therefore, it is ensured that underflow is avoided even if the bit arrival delay of the leading block of G(i,n) is the maximum value dgt(i,n)−dgt(i,n−1). Thus, the instantaneous decode time of all blocks in G(i,n) are to be delayed to dgt(i,n). That is to say, the decode start time of the leading block in P(i) is dgt(i,l). Thus, the first problem with the conventional technology is that it is not possible to further reduce the codec delay.

Furthermore, in the conventional technology, it is assumed that it is possible to instantaneously display the picture after decoding by a decode time ct/N. However, in Non-patent Document 1, an encoding method referred to as tiles is used, by which the picture is not only be divided horizontally, but may also be divided vertically. Thus, even after decoding by a decode time ct/N, there may be cases where it is not possible to instantaneously display the picture. An example where it is not possible to instantaneously display the picture is described with reference to FIG. 5.

FIG. 5 illustrates an example where instantaneous display of an image is not possible. In Non-patent Document 1, the areas of a picture, which are obtained by dividing the picture not only horizontally but also vertically, are referred to as tiles. In the example of FIG. 5, the picture is divided into four tiles.

In the order of top left, top right, bottom left, and bottom right, the tiles are referred to as tile 0(t40), tile 1(t41), tile 2(t42), and tile 3(t43), and the tiles are processed in this order.

Furthermore, inside each tile, there are several groups including plural blocks. In the example of FIG. 5, groups 0 through 3 are indicated by s41 through s44. In this case, the decoding is performed in the order of groups, which is a scan order or a decoding order as indicated by reference numerals sc41 to sc42.

Unlike the decoding order, the display order may be a raster scan depending on the display. In this case, the order is as indicated by the reference numeral sc43. In this case, even if the decoding process for the groups is completed, it is not be possible to instantaneously display the picture.

For example, immediately after decoding a group 0 (s41), the CTB in the left half of the upper stage of the picture included in the tile 0 (t40), e.g., a block b41 and a block b42, belong to the group 0 (s41) and are thus displayable. However, the CTB in the right half of the upper stage of the picture included in the tile 1 (t41), e.g., a block b45 and a block b46, belong to the group 2 (s43), are not decoded and are thus not displayable.

When the display is performed by raster scan, the structure is configured to display pictures in the order from the left edge of the screen to the right edge of the screen. Therefore, when the top stage of the picture is to be displayed, the block belonging to group 2 (s43) is to be displayed. Therefore, it is to be waited for group 2 (s43) to be decoded so that group 2 (s43) becomes displayable.

The time taken for the decoding of group 2 (s43) to be completed is the time taken to decode all blocks through which sc41 and sc42 pass in the scan order.

In the group division method, decoding may be performed quickly, but there is no consideration about the displayable time. Thus, the second problem with the conventional technology is that in order to ensure that a picture is displayed, the time for one picture is to be waited.

Furthermore, Non-patent Document 1 defines an operation when the bit amount to be used for decoding a picture is larger than the bit amount that may be accumulated in a buffer, in a case where the picture is more complex.

FIG. 6 illustrates an operation when the bit amount to be used for decoding a picture is larger than the bit amount that may be accumulated in a buffer. The video image encoding device adjusts the encoding amount so that the accumulation of rate R indicated by a predetermined rate 51 in a graph 50 in FIG. 6 does not exceed the accumulation 52 of the drawn out bit amount of the picture.

However, when the picture is complex, the bit amount accumulated in the buffer is not enough for encoding, and there are cases where underflow occurs. An example is the case of a graph 53 in FIG. 6.

When underflow occurs, as indicated by a graph 54 in FIG. 6, the decoding device does not start decoding at the original decode time dt(0) of the picture, but executes decoding at the time dt' when bits used for decoding are received at the buffer.

Generally, the display timing of a delayed picture is the timing dt(1), which is when the next picture is supposed to be displayed. For the picture that is supposed to be displayed at the time dt(1), decoding is performed but displaying is skipped.

The third problem with the conventional technology is that Non-patent Document 1 does not clearly define the operation when underflow occurs is units of groups.

SUMMARY

According to an aspect of the embodiments, a video image encoding device includes a group configuration determination unit configured to determine a group to which each of a plurality of blocks belongs, the plurality of blocks being obtained by dividing each picture included in video image data; a group information addition unit configured to add, to an output stream, group information expressing the group to which each of the plurality of blocks belongs; a group output time calculation unit configured to calculate an output time for each of the groups; a group output delay determination unit configured to determine output delay for each of the groups; a group output delay information addition unit configured to add, to the output stream, an output delay time from a decode time of each of the groups; an encode amount control unit configured to control an encode amount so that data used for outputting all of the blocks included in one of the groups arrives at a decoding buffer of a decoding device and decoding is completed by an output time expressed by the output delay time; and an encoding process unit configured to perform encoding based on control information of the encode amount control unit.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENTS

Preferred embodiments of the present invention will be explained with reference to accompanying drawings. A video image encoding device described in the embodiments encodes pictures included in video image data in units of groups, and outputs a bit stream as encoded data.

The picture may be a frame or a field. A frame is one still image in the video image data, while a field is a still image obtained by extracting data of odd number rows or data of even number rows from a frame.

Furthermore, the video image that is an encoding target may be a color video image or a monochrome video image.

First Embodiment

Configuration

Figure 7:
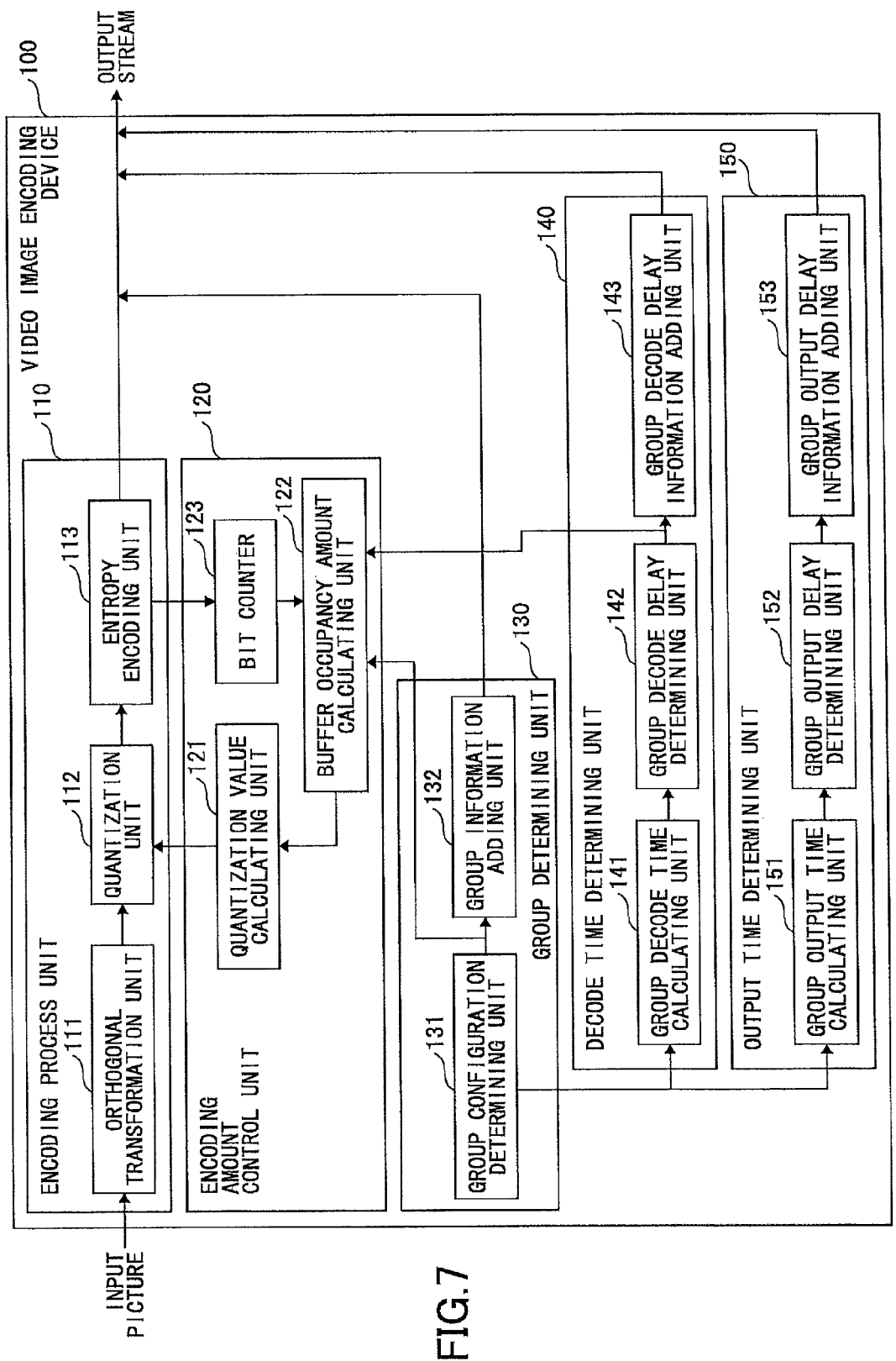
FIG. 7 is a block diagram illustrating a schematic configuration of a video image encoding device according to a first embodiment.

FIG. 7 is a block diagram illustrating a schematic configuration of a video image encoding device 100 according to a first embodiment. The video image encoding device 100 includes an encoding process unit 110, an encoding amount control unit 120, a group determining unit 130, a decode time determining unit 140, and an output time determining unit 150.

The encoding process unit 110 includes an orthogonal transformation unit 111, a quantization unit 112, and an entropy encoding unit 113.

The encoding amount control unit 120 includes a quantization value calculating unit 121, a buffer occupancy amount calculating unit 122, and a bit counter 123.

The encoding amount control unit 120 controls the encoding amount so that data used for outputting all blocks included in a group arrives at a decoding buffer of a decoding device and decoding is completed by an output time expressed by an output delay time.

The group determining unit 130 includes a group configuration determining unit 131 and a group information adding unit 132.

The decode time determining unit 140 includes a group decode time calculating unit 141, a group decode delay determining unit 142, and a group decode delay information adding unit 143.

The output time determining unit 150 includes a group output time calculating unit 151, a group output delay determining unit 152, and a group output delay information adding unit 153.

The units included in the video image encoding device 100 are mounted in the video image encoding device 100 as separate circuits. Alternatively, the units included in the video image encoding device 100 may be mounted in the video image encoding device 100 as a single integrated circuit in which circuits implementing the functions of the units are integrated. Alternatively, the units included in the video image encoding device 100 may be functional modules realized by computer programs executed in a processor included in the video image encoding device 100.

The encoding target picture included in the video is divided into units of blocks by a control unit (not illustrated), and the respective blocks are input into the orthogonal transformation unit 111. The blocks include, for example, 16×16 pixels.

The orthogonal transformation unit 111 calculates an intra predicted value or an inter predicted value from a picture that has been locally decoded and stored in a frame memory (not illustrated). Then, the orthogonal transformation unit 111 performs a difference operation on the input block and the calculated value, and calculates a predicted block error. Furthermore, the orthogonal transformation unit 111 performs orthogonal transformation on the predicted block error.

The quantization unit 112 performs quantization on the predicted block error that has undergone orthogonal transformation. The quantization parameter (control information) in a quantization operation is given by the quantization value calculating unit 121. The quantized orthogonal transformation coefficient obtained as a result of quantization and the parameter (intra predicted direction, motion vector information) of intra prediction or inter prediction are output to the entropy encoding unit 113 as compressed data of the block. A local decoding unit (not illustrated) performs inverse quantization and inverse orthogonal transformation on the quantized orthogonal transformation coefficient, and then adds the intra predicted value or the inter predicted value to generate a locally decoded block, and stores the block in a frame memory.

The entropy encoding unit 113 performs entropy encoding on block compressed data output from the quantization unit 112.

The quantization value calculating unit 121 calculates the quantization value of each block from the state of the receiving buffer in an ideal decoding device and the upper limit of the amount of generated information of a block to be encoded next, which are output from the buffer occupancy amount calculating unit 122.

The buffer occupancy amount calculating unit 122 calculates the state of the receiving buffer in an ideal decoding device and the upper limit of the amount of generated information of a block to be encoded next, based on a bit amount cumulative value of encoded data output from the bit counter 123, group information output from the group configuration determining unit 131, and the decode time of the group and the decode delay of the group output from the group decode delay determining unit 142.

The bit counter 123 counts the number of output bits of the entropy encoding unit 113, and outputs a cumulative value of the encoded data.

The group configuration determining unit 131 determines, for a plurality of blocks, the group to which each block belongs. The group configuration determining unit 131 determines the group to which a block undergoing an encoding process belongs by a predetermined method, using block count information received from a control unit (not illustrated) and encoding method specification information received from a control unit (not illustrated).

The block count information expresses the number of each block included in a picture. For example, a number of a block at the top left edge of a picture is set as one, and numbers are sequentially assigned to the blocks in the order of raster scanning. Then, the highest number is assigned to the block on the bottom right edge of the picture. The block count information may include numbers assigned to blocks according to another order.

The group configuration determining unit 131 preferably determines plural groups in a manner that the respective groups include the same number of blocks as much as possible, in order to equalize the decoding process time of the groups.

For example, if the group configuration determining unit 131 divides the blocks into groups in units of block lines, it is possible to equalize the number of blocks included in each group in an arbitrary picture size.

For example, when the picture size is 1920 pixels×1088 pixels corresponding to a High Definition Television (HDTV), the block size is 16 pixels×16 pixels and the number of block lines is 68. Therefore, in this case, each block included in the encoding target picture is classified into one of 68 groups.

The number of blocks included in each group may be a value of from one to the total number of blocks in the entire screen.

The group configuration determining unit 131 reports the identification information of the group to which the encoding target block belongs, to the buffer occupancy amount calculating unit 122. The group configuration determining unit 131 reports information of the block included in each group to the group decode time calculating unit 141 and the group output time calculating unit 151. The group configuration determining unit 131 may report the index of the block positioned at the beginning of each group to the group decode time calculating unit 141 and the group output time calculating unit 151.

The group information adding unit 132 adds, to the encoded data, group information indicating the number of groups in the picture and block information in each group.

The group decode time calculating unit 141 calculates the decode time of each group from group information output from the group configuration determining unit 131, and reports the decode time to the group decode delay determining unit 142.

The group decode delay determining unit 142 determines the decode delay of each group, and reports the decode delay together with the decode time of each group to the buffer occupancy amount calculating unit 122 and the group decode delay information adding unit 143. The determined decode delay is reported as delay information.

The group decode delay information adding unit 143 receives the decode time and the decode delay of the group, and adds this information to the encoded data as group decode delay information.

The group output time calculating unit 151 calculates an output time (also referred to as "display time") of each group based on encoding method specification information received from a control unit (not illustrated) and group information output from the group configuration determining unit 131, and reports the output time information to the group output delay determining unit 152.

The group output delay determining unit 152 determines the output delay of each group from the output time of each group, and reports the output delay information to the group output delay information adding unit 153.

The group output delay information adding unit 153 receives the output time and the output delay of each group, and adds the output delay time from the decode time of each group to the encoded data as group output delay information.

Decode Delay

A case where the blocks in an "i" th picture P(i) are instantaneously decoded at equal intervals between dt(i−1) and dt(i) is considered. In this case, in the cumulative graph line f(t) of the consumed encoded data, it is possible to reduce the block transmission delay by appropriate rate control such as setting the lower limit and the upper limit of the information amount in each block. Furthermore, by reporting this information to the video image decoding device, the earliest decode start time of the block may be further accelerated. A description is given with reference to FIG. 8.

Figure 8:
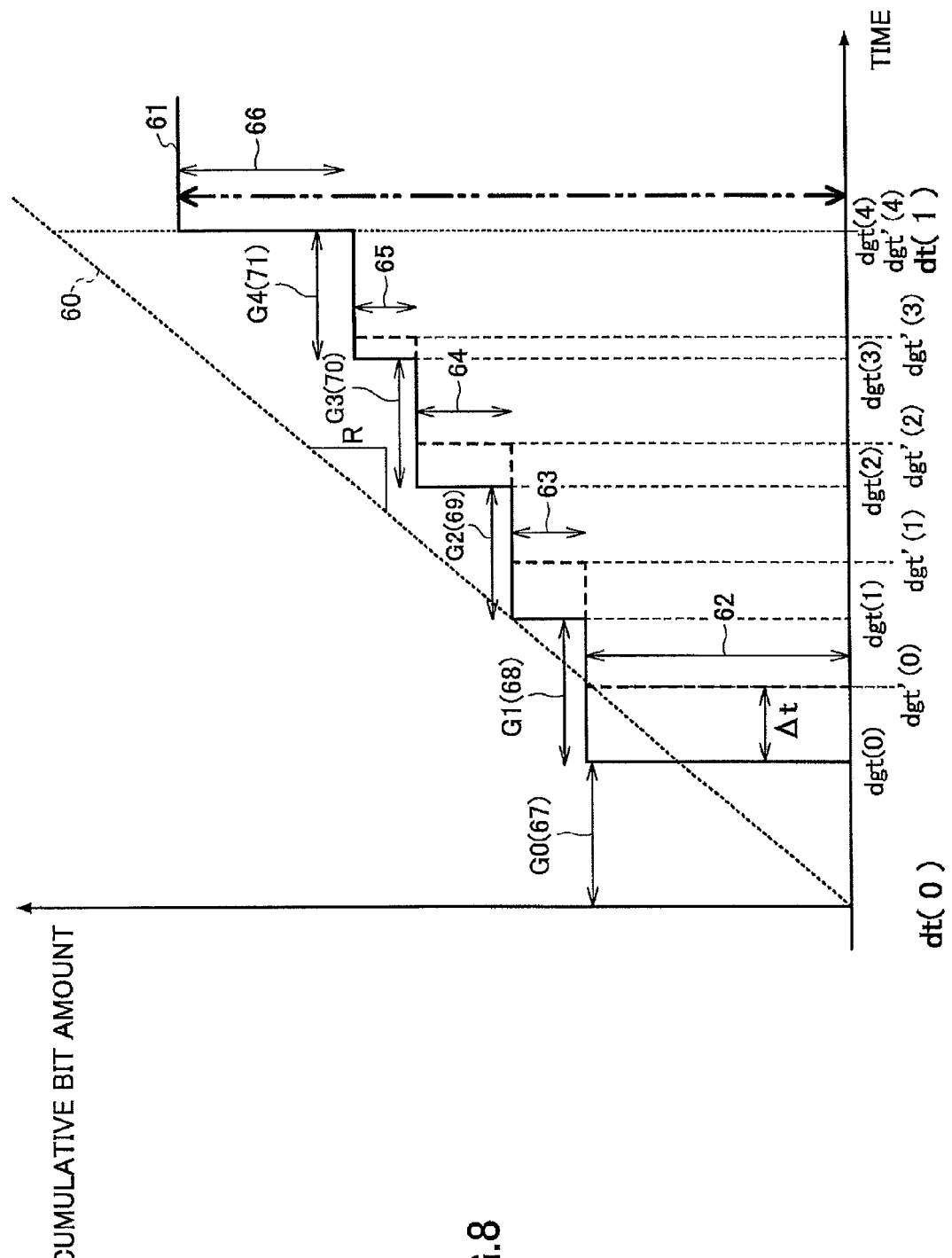
FIG. 8 illustrates a cumulative value of encoded data in the case of focusing on P(i)

FIG. 8 illustrates the cumulative value of encoded data in the case of focusing on P(i). A graph line 60 expresses the cumulative value of the arriving amount of encoded data at the rate of R. A graph line 61 is the cumulative value of consumed encoded data in a case where instantaneous decoding is performed in units of pictures.

Reference numerals 62 through 66 are cumulative values of encoded data consumed for decoding at the respective groups (G0 through G4) expressed by reference numerals 67 through 71.

Looking at the relationship between the range in which the groups are present and the graph line 60, in G(1) through G(4), the rate is constantly greater than the cumulative value of the encoded data. Therefore, even when instantaneous decoding on the blocks in G(1) through G(4) is performed at equal intervals between dt(i−1) and dgt(i,1), underflow does not occur.

In G(0), the cumulative value of encoded data in G(0) exceeds the rate, and therefore underflow occurs. To avoid underflow, the cumulative value of encoded data is not to exceed the rate, and the minimum value is an interval Δt.

Δt is less than dgt(i,n)−dgt(i,n−1) in any of the groups. The video image decoding device uses the maximum value of Δt in each group in P(i), to set the decode start time in the leading block in P(i) to dt(i−1)+Δt(i), so that instantaneous decoding is performed at equal intervals on all blocks without causing underflow.

In the entire sequence, from the maximum value Δt of Δt(i) of all pictures, the decode start time dinit of the leading block in the first picture is expressed by the following formula. Accordingly, all blocks in all pictures are instantaneously decoded at equal intervals without causing underflow.

$$dinit=dly-(dt(1)-dt(0))+\Delta t \qquad \text{Formula 3}$$

The earliest time r(i, n) at which decode start becomes possible in the "n" th group in P(i) is expressed by the following formula.

$$r(i,n,)=\Delta t+n/N(dt(i)-(dt(i-1)+\Delta t)) \qquad \text{Formula 4}$$

In the video image encoding device, the generated information amount in each picture and each group is controlled so that Δt is less than dgt(i,n)−dgt(i,n−1), and the value of Δt is explicitly transmitted to the video image decoding device. In the video image decoding device, the instantaneous decode time of group G (i, n) is r (i, n), and therefore the decode start time of each block is securely ensured.

The group in the video image decoding device does not have to match the group reported from the video image encoding device. In a case where the group in the video image decoding device matches the group reported from the video image encoding device, r(i,n)=dgt(i,n) is satisfied.

Display Delay

By explicitly reporting the display delay of a target group as additional extended information, the earliest display timing is reported to the decoding device, and the display delay is minimized. For example, a method of specifying display delay in a case of tile division and group division as illustrated in FIG. 5, is described with reference to FIGS. 5 and 9.

Figure 1:
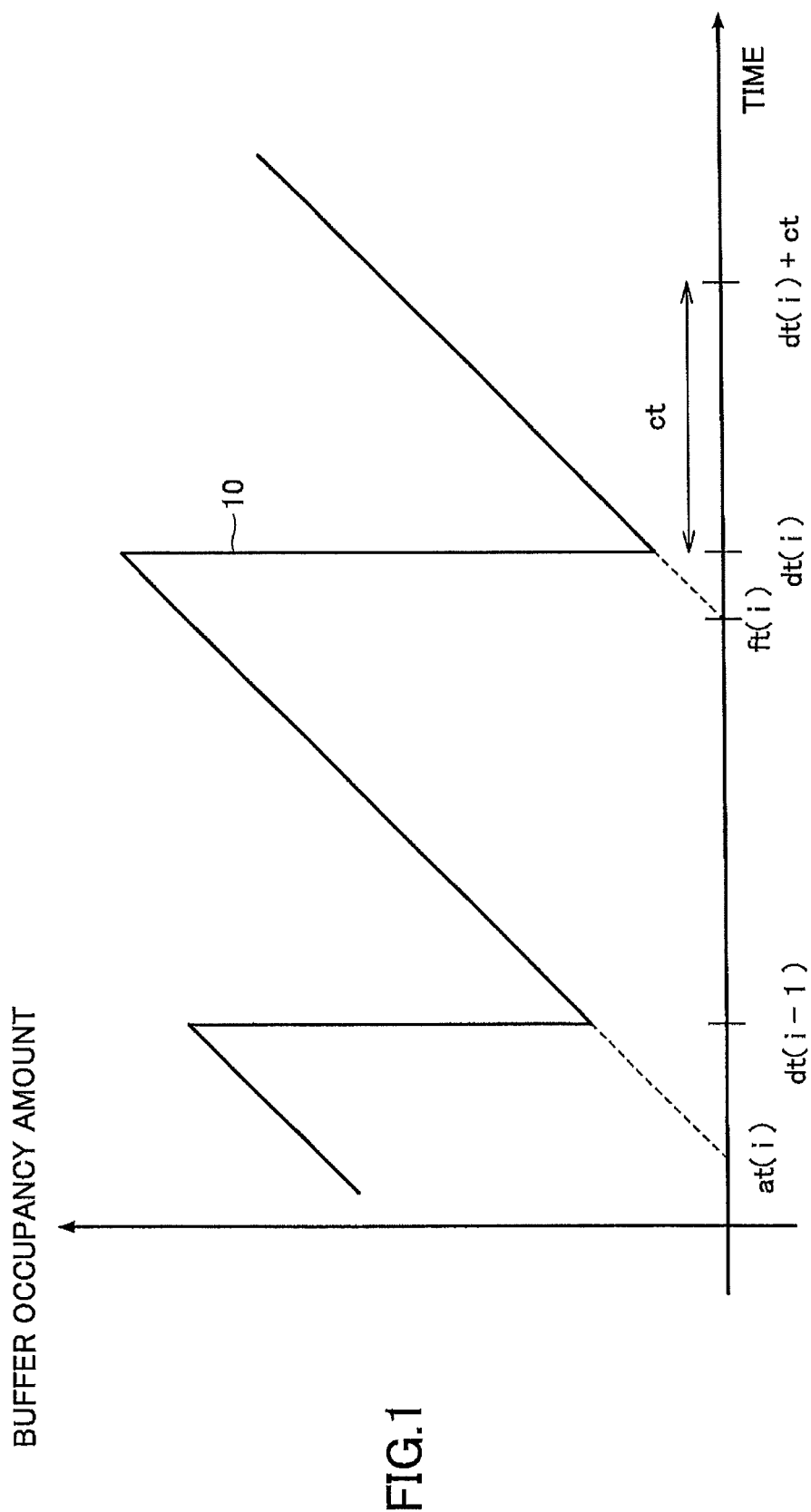
FIG. 1 illustrates an example of the transition of the buffer occupancy amount of a receiving buffer according to the conventional technology.
Figure 2:
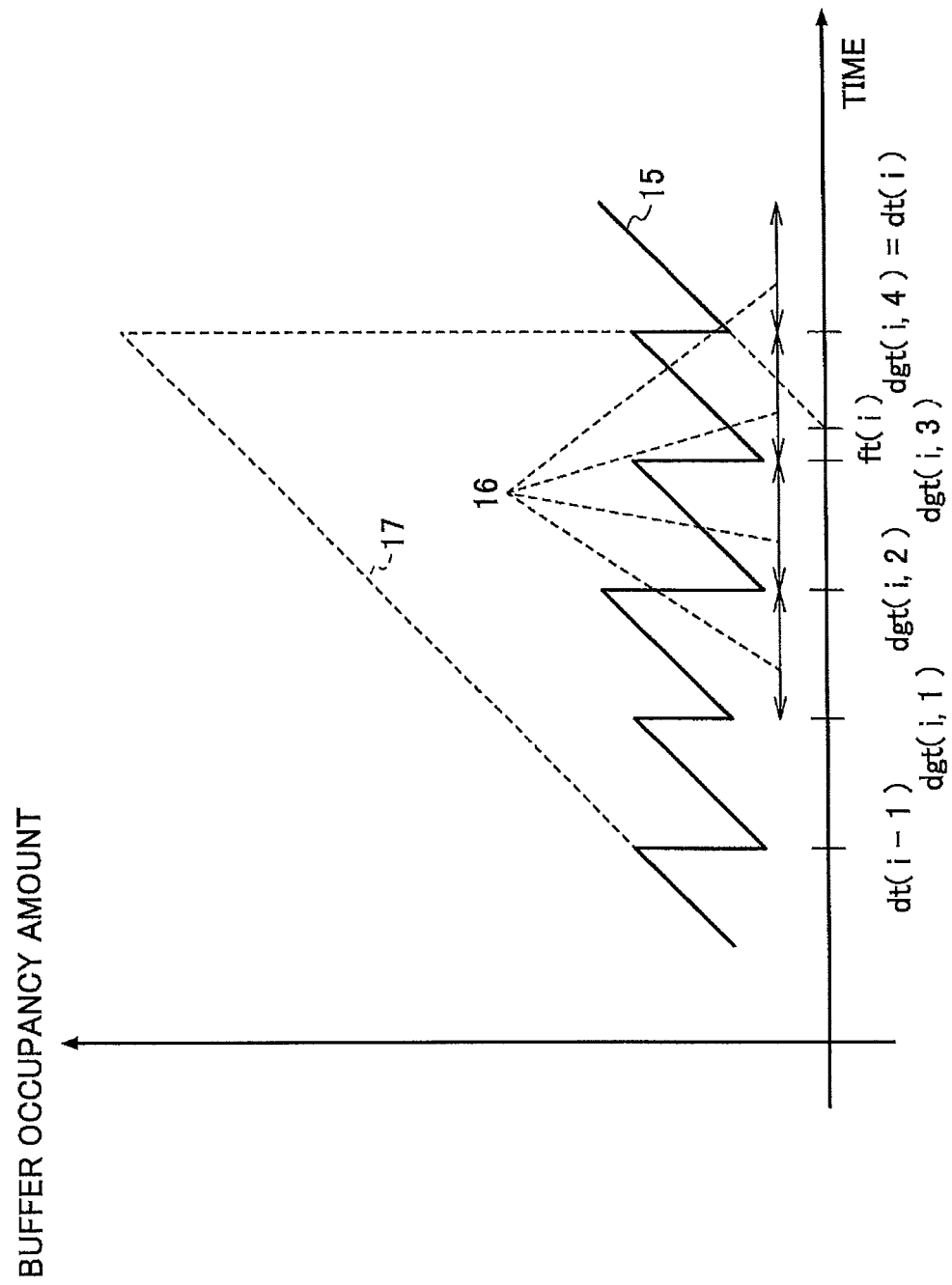
FIG. 2 illustrates an example where the codec delay is made to be less than one picture time by group division.
Figure 3:
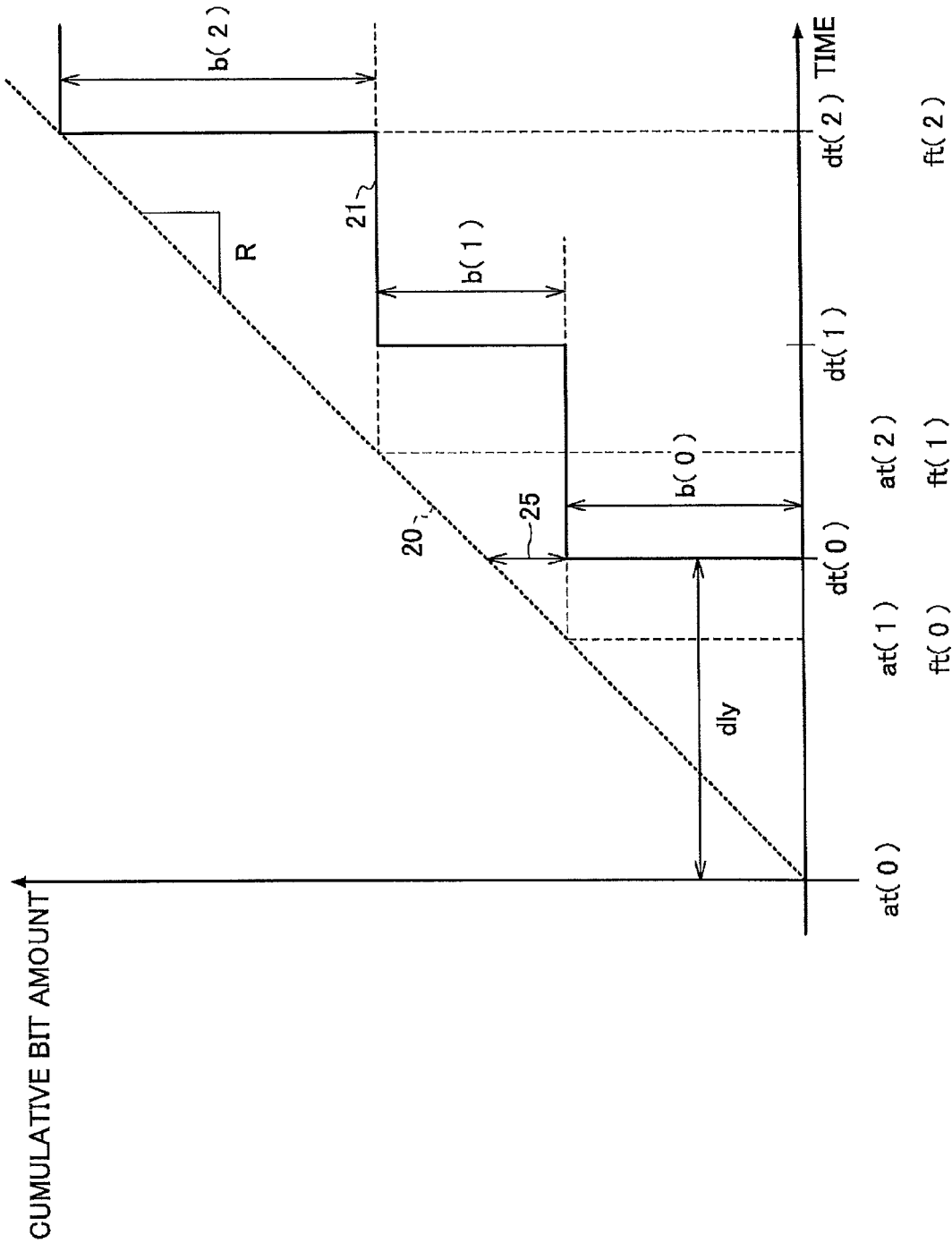
FIG. 3 illustrates operations of a receiving buffer of a video image decoding device.
Figure 4:
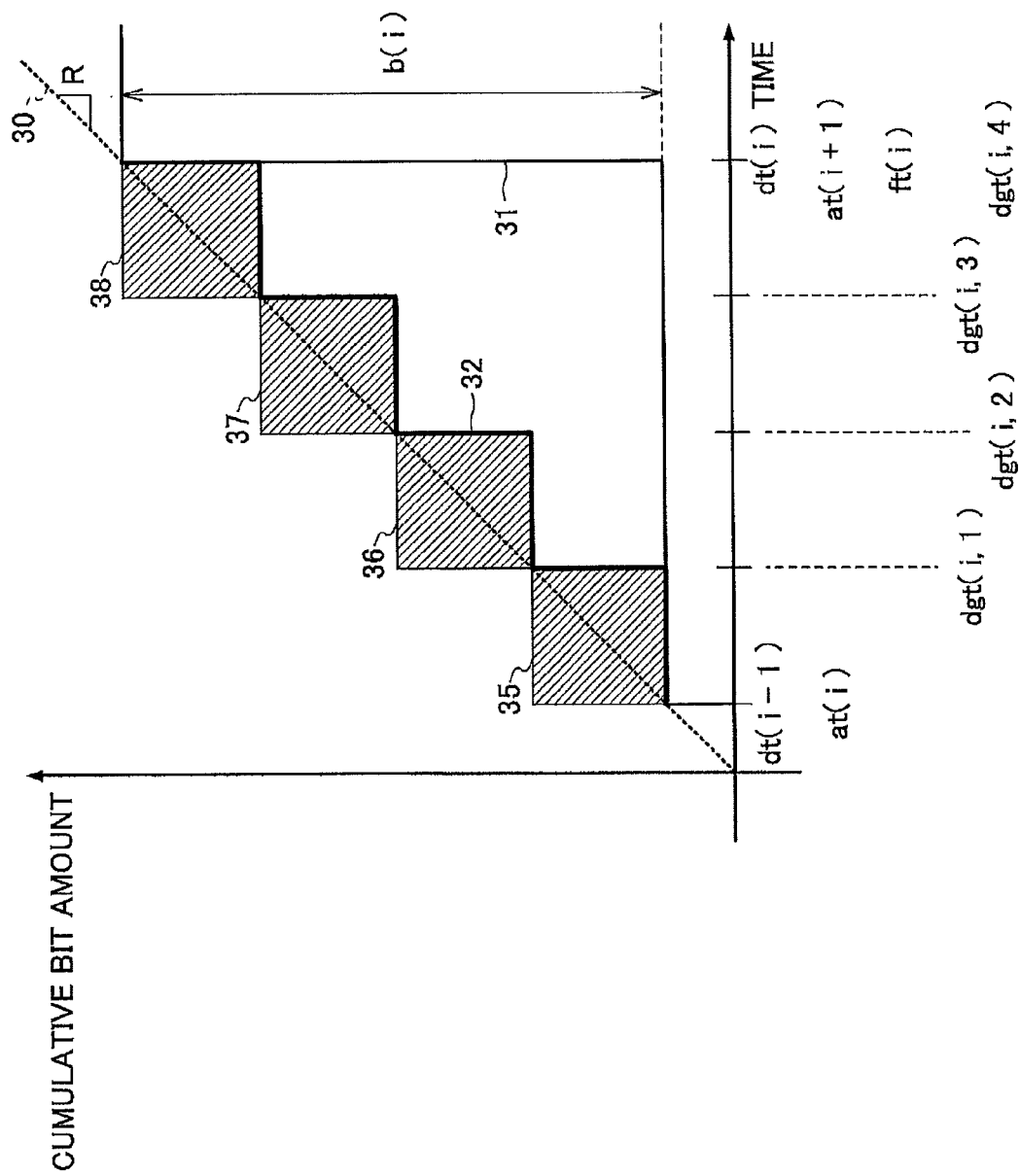
FIG. 4 illustrates the operation of the receiving buffer focusing on one P(i)
Figure 5:
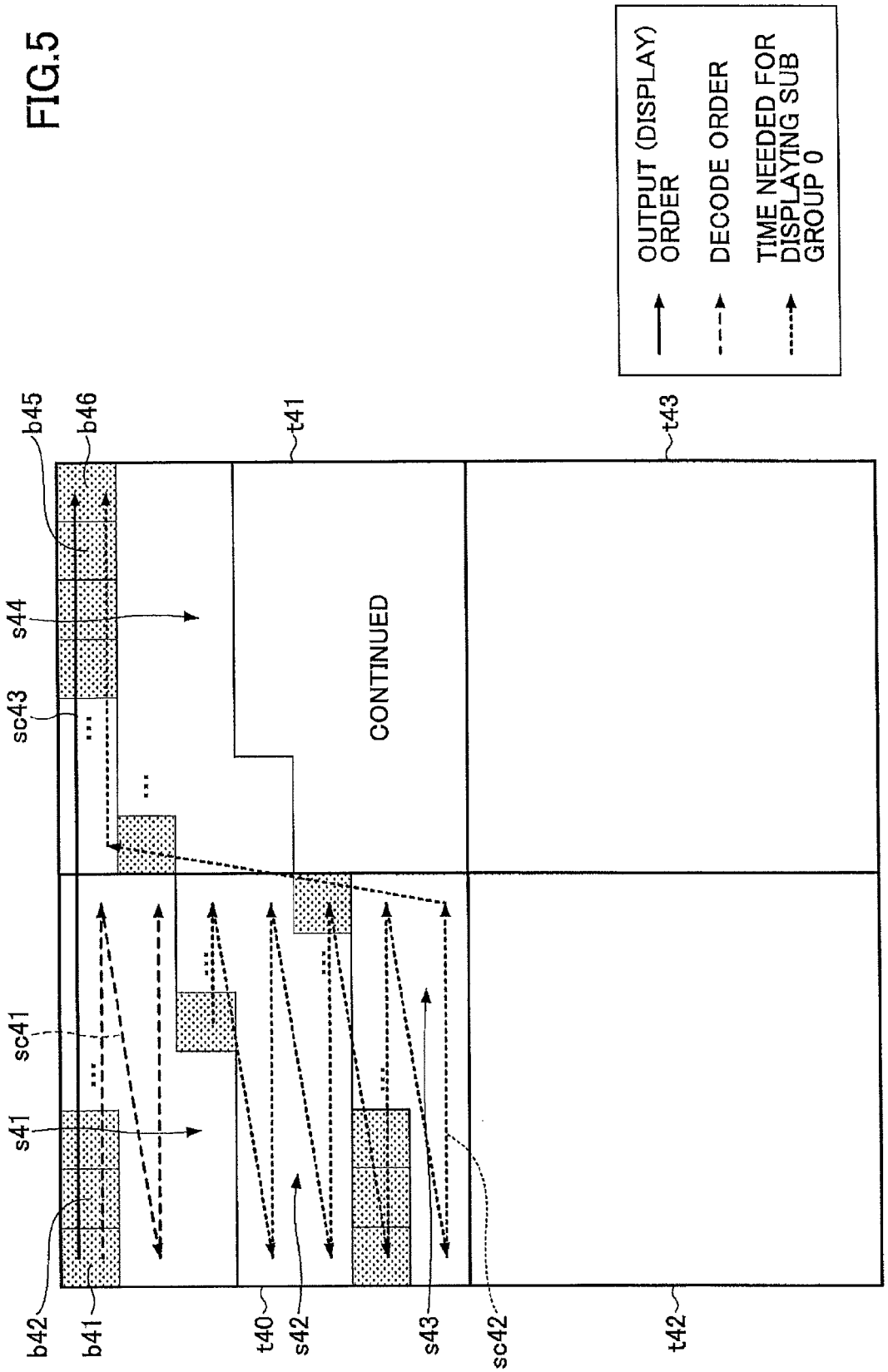
FIG. 5 illustrates an example where instantaneous display of an image is not possible.
Figure 6:
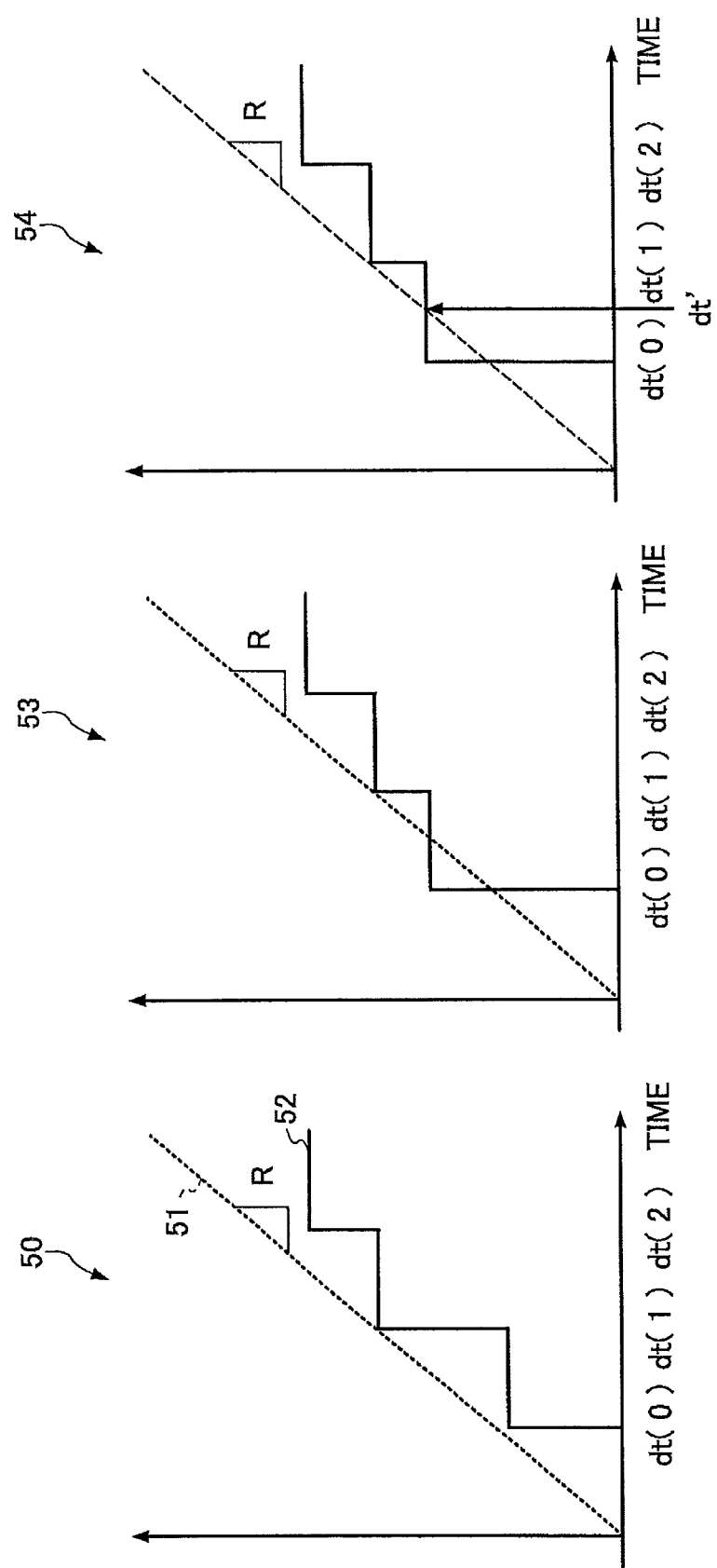
FIG. 6 illustrates an operation when the bit amount to be used for decoding a picture is larger than the bit amount that may be accumulated in a buffer.

In FIG. 5, the display delay is maximum when displaying the topmost stage in group 0 (s41). To start displaying the topmost stage of group 0 (s41), at least decoding of the pixel value in the topmost stage of the picture in group 2 (s43) is to be finished. Therefore, the display delay is explicitly reported as additional extended information.

Figure 9:
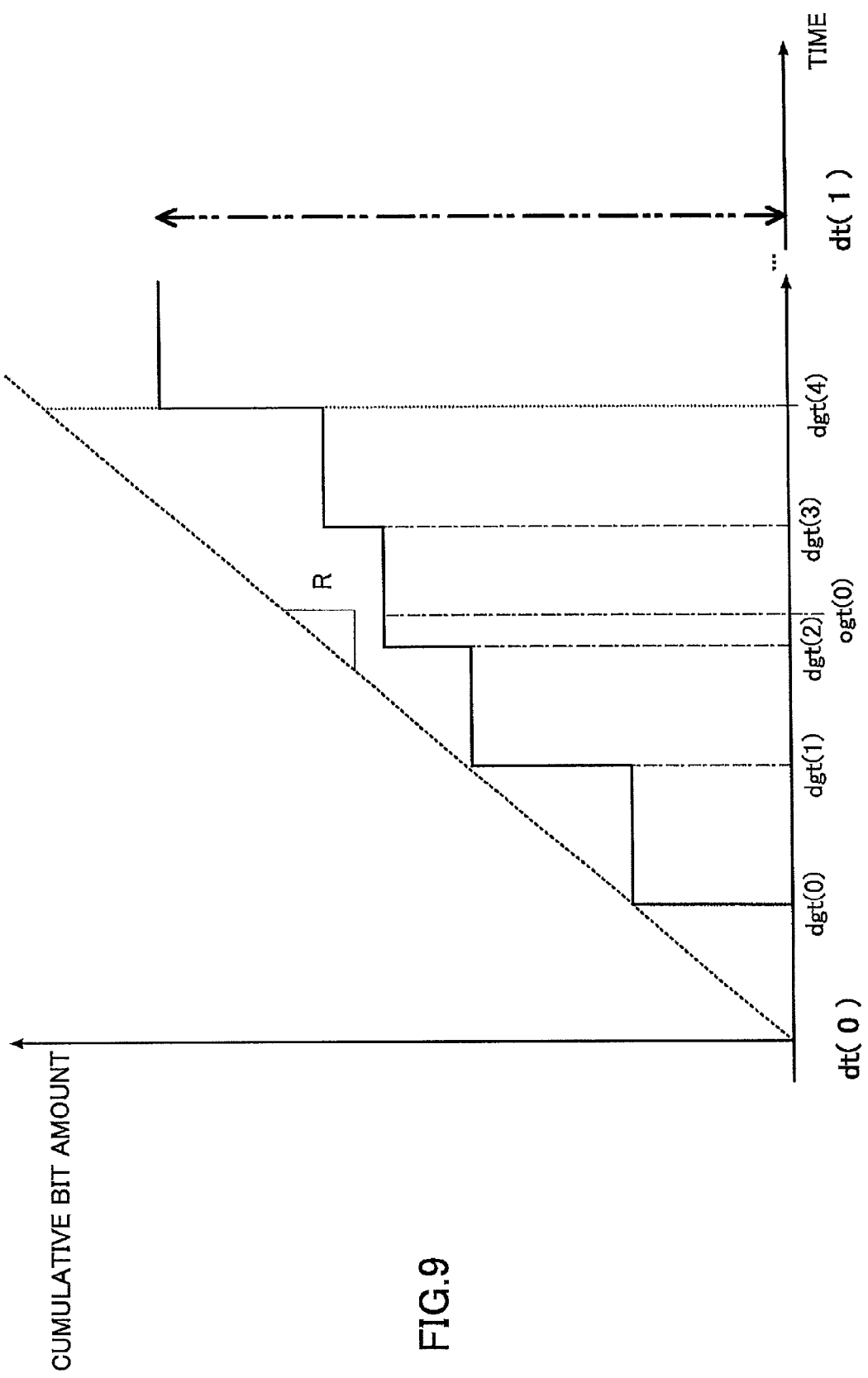
FIG. 9 illustrates display delay.

FIG. 9 illustrates display delay. The time when display of the topmost stage of group 0 (s41) becomes possible is ogt (0) indicated in FIG. 9. At ogt (0), the time taken for decoding is set to be slower than the draw out time dgt(2) of group 2. The display time in this case is expressed by the following formula, assuming that the decoding of a picture is performed at a fixed speed.

$$ogt(0)=dgt(0)+(dgt(2)-dgt(1))+l/L(dgt(3)-dgt(2)) \qquad \text{Formula 5}$$

L is the total number of lines in the perpendicular direction in group 2 denoted by s43, and l expresses the "l" th line corresponding to the top right edge of the picture in group 2 denoted by s43. l/L(dgt(3)−dgt(2)) expresses the time when decoding of the top right edge of the picture in group 2 denoted by s43 is completed, assuming that decoding a group takes one group time.

That is to say, the display possible time is obtained by adding, to the decode time dgt(0) of group 0 denoted by s41, the time taken from the instantaneous decode time of group 0 denoted by s41 to the instantaneous decode time of the group 2 denoted by s43. Furthermore, the display possible time is obtained by adding the time actually taken to complete the decoding on the top right edge of the picture in group 2.

In the video image encoding device, by explicitly sending the time expressed by the above Formula 5 as additional extended information, it is possible to report, to the decoding device, an appropriate time in consideration of the actual decode time, and therefore display with a small amount of delay is ensured.

In the above example, when the part of the display time, corresponding to when decoding is completed on the top right edge of the picture in group 2, is expressed by the time dgt(3)−dgt(2) taken to actually complete decoding on the entire group 2 denoted by s43, an earlier time is reported compared to the case where the display possible time is the time when decoding on one picture is completed. Therefore display with a small amount of delay is ensured.

Calculation of Decode Time

Next, a description is given of a method of calculating group decode time information according to the first embodiment. In the following description, the total number of blocks included in the encoding target picture is M.

The group decode time calculating unit 141 first calculates a decode time dgt(i,n) expressing the time at which the "n" th group G(i,n) in the picture P(i) is decoded, based on the decode time dt(i){=t(i)+dly} of the "i" th picture P(i) delayed by a predetermined delay time dly from the input time t(i) of the "i" th picture P(i) in the encoding order. Alternatively, instead of dgt(i,n), the group decode time calculating unit 141 may calculate {dgt(i,n)−dgt(i,n−1)} that is equal to dgt(i,n) as the decode time. Furthermore, the group decode time calculating unit 141 may convert the decode time into an appropriate unit, such as a multiple of 1/90000 seconds.

In order to equalize the time taken to perform a decoding process on each block included in each group, the group decode time calculating unit 141 determines the decode time of each group by equally dividing the time taken to perform a decoding process per picture by the number of groups N. In this case, the decode time dgt(i,n) of G(i,n)(n=1, 2, . . . , N) is calculated by the following Formula 6.

$$dgt(i,n)=dt(i-1)+\{dtIi)-dt(i-1)\}\cdot n/N \quad \text{Formula 6}$$

dgt(i) is the decode time of P(i). d(i+1)−d(i) is fixed regardless of i, and is hereinafter expressed as "s".

Furthermore, the group decode time calculating unit 141 may determine the decode time dgt(i,n)(n≥2) of the second group onward that are encoded/decoded, by the following formula.

$$dgt(i,n)=dgt(i,1)+\{dt(i)-dgt(i,1)\}\cdot (n-1)/(N-1) \quad \text{Formula 7}$$

Furthermore, the group decode time calculating unit 141 may determine the decode time dgt(i,n)(n≥2) of the second group onward that are encoded/decoded, by the following formula.

$$dgt(i,n)=dt(i-1)+\Delta t+\{dt(i)-(dt(i-1)+\Delta t)\}\cdot (n-1)/(N-1) \quad \text{Formula 8}$$

The group decode delay determining unit 142 determines the maximum value Δt of block delay in the entire picture before starting the encoding. Δt is determined to be a value in a range expressed by the following formula.

$$0 \le \Delta t \le (dgt(in,+1)-dgt(i,n)) \quad \text{Condition 1}$$

The buffer occupancy amount calculating unit 122 calculates the buffer occupancy amount of the receiving buffer of an ideal decoding device and the upper limit in the information amount generated in a block that is encoded next, as follows.

Figure 10:
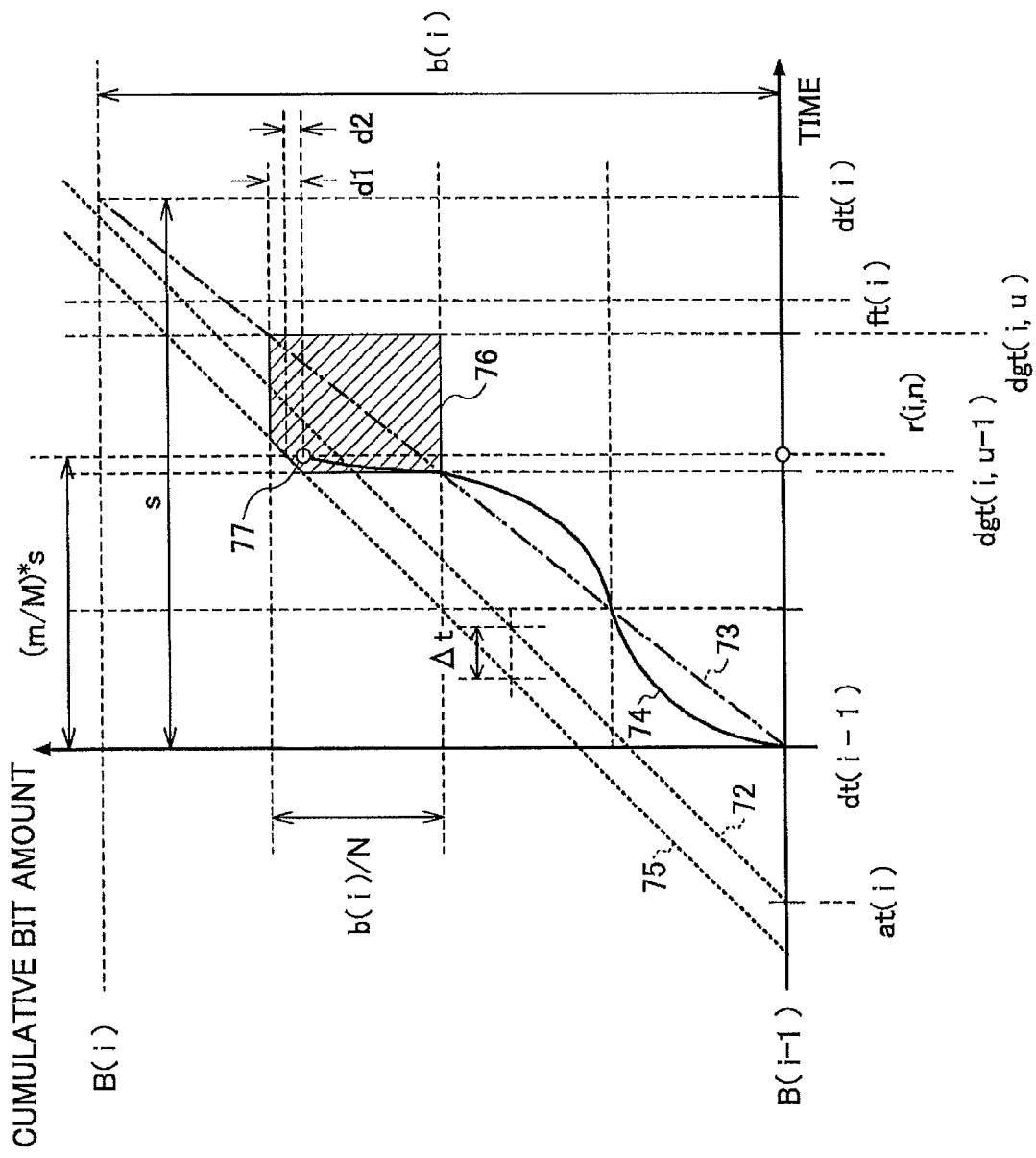
FIG. 10 illustrates the relationship between a cumulative value of bit amounts of encoded data arriving at the receiving buffer and the cumulative value of the information amount generated in each block in P(i)

FIG. 10 illustrates the relationship between a cumulative value of bit amounts of encoded data arriving at the receiving buffer of an ideal decoding device and the cumulative value of the information amount generated in each block in P(i), in the encoding process of P(i).

A graph line 72 expresses the cumulative value R(t) of the bit amount of encoded data that has arrived at the receiving buffer of the ideal decoding device. A graph line 75 is obtained by shifting the graph line 72 to the left by Δt, and expresses R'(t). The relationship of R'(t)=R(t+Δt) is satisfied.

B(i) indicated in FIG. 10 expresses the cumulative value of encoded data generated from P(0) to P(i). b(i) expresses the information amount generated in the entire P(i), and is the same as B(i)−B(i−1).

In a graph line 73, the value at time dt(i−1) is B(i−1), the value at time dt(i) is B(i), and the graph line 73 is a straight line V(t) having a tilt of b(i)/s. s expresses one picture time, which is the same as dt(i)−dt(i−1).

The graph line 73 corresponds to a curve f(t) expressing consumption of encoded data in units of blocks, when the blocks are decoded at equal intervals from a time dt(i−1) to a time dt(i) and when the generated information amount is equal at b(i)/M.

A graph line 74 is a curve f(t) expressing consumption of encoded data in units of actual blocks, and a point 77 expresses the cumulative value of the consumption amount of encoded data in units of blocks when the decoding is performed up to the "m" th block.

In order to prevent underflow of the receiving buffer in the ideal decoding device when group n is decoded at a group decode early start time r(i,n) calculated from the group decode time information, the following condition is to be satisfied. The quantization value calculating unit 121 calculates the quantization value so that the following condition is constantly satisfied.

$$f(r(i,n))\le R'(r(i,n))$$

$$f(dgt(i,n-1))\le V(dgt(i,n-1))$$

$$f(dgt(i,n))\le V(dgt(i,n)) \quad \text{Condition 2}$$

An area 76 indicates the range in which f(t) may be obtained between a time dtg(i,u−1) to a time dtg(i,u).

Calculation of Quantization Value

A description is given of a method of calculating the quantization value of a block m performed by the quantization value calculating unit 121. In the first embodiment, an equal number of blocks are included in each group, which is M/N.

To start a process on a leading block in the "n" th group G(i,n) to which the block m belongs, the target information amount T(i,n) of G(i,n) is calculated by the following formula. Here, n=Ceil(m*N/M) is satisfied.

$$T(i, n) = (T(i)/N) + T(i)*((n-1)/N) - \sum_{j=1}^{n-1} T'(i, j) \quad \text{Formula 9}$$

T(i) is the target information amount of the entire P(i), and T'(i,n) is the actual information amount generated at G(i,n). T(i) is the total sum of the actual information amount generated from P(0) to P(i−1), using a known method.

For example, the quantization value calculating unit 121 calculates the quantization value according to the quantization value calculating method described in the standardization organization reference software Test Model 5 in MPEG-2 (see Non-patent Document 2), so that the actual information amount generated in G(i,n) approaches T(i,n).

Next, the quantization value calculating unit 121 compares a predetermined threshold DTH with a difference d1 which is the difference between the expected value b'(i,n) of the cumulative value of the information amount generated in P(i) when the encoding process is completed for the entire G(i,n), and the cumulative value B(i,n−1) of the information amount generated in P(i) before performing entropy encoding on the "n" th group.

b'(i,n) is calculated by the following formula.

$$b'(i, n) = T(i, n) + \sum_{j=1}^{n-1} T'(i, j) \qquad \text{Formula 10}$$

The threshold DTH1 is expressed by the following formula.

$$DTH1 = b0*((M/N)-m) + \text{offset} \qquad \text{Formula 11}$$

b0 is the maximum encoding amount generated in each block, when the quantization value is the maximum value in the possible range. ((M/N)−m) corresponds the number of blocks for which the encoding process has not been completed in G(i,m). offset is the margin term.

When d1<DTH1 is satisfied, the quantization value calculating unit 121 sets the quantization value as the maximum value.

b0 may be the encoding amount of the block when all frequency coefficients are zero. When d1<DTH1 is satisfied, the quantization value calculating unit 121 determines the quantization value so that all frequency coefficients of encode target blocks are quantized to zero. By this control operation, when the average value of encoding amounts of remaining blocks for which the encoding process is not completed in the group does not exceed b0, T(i,n)T' (i,n), i.e., f(dtg(i,n))≤V(dtg(i,n)) is ensured. Thus, it is ensured that the receiving buffer of the ideal decoding device does not underflow.

As described above, the quantization value calculating unit 121 actually transmits the output stream from the video image encoding device 100 to a video image decoding device according to a predetermined rate R, and therefore the encoding amount of the video image data is controlled so that the receiving buffer of the video image decoding device does not underflow.

The quantization value calculating unit 121 reports the obtained quantization value to the quantization unit 112.

As described above, by controlling the buffer in units of groups and adding a group encoding delay, a buffer delay is appropriately reduced without causing overflow or underflow.

Calculation of Output Time

Figure 11:
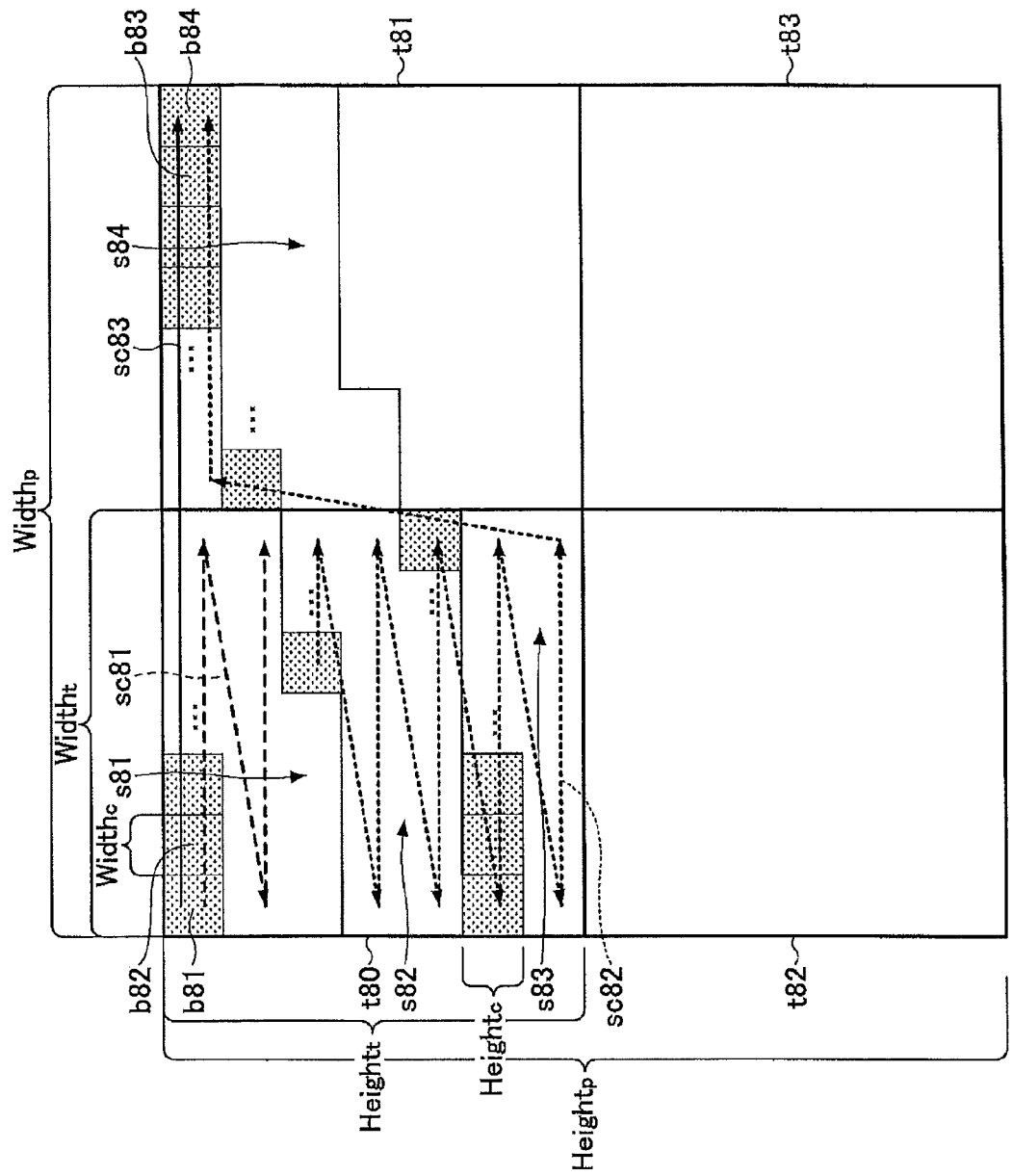
FIG. 11 is for describing the calculation of group output time information.

Next, a description is given of a method of calculating the group output time information according to the first embodiment. FIG. 11 is for describing the calculation of the group output time information.

In the following description, the total number of blocks included in the encoding target picture is M. Furthermore, the width and height of the picture, the width and height of the tile, and the width and height of the CTB are (width$_p$, height$_p$), (width$_t$, height$_t$, and (width$_c$, height$_c$), respectively. The sizes of all tiles (t80 through t83) are the same, and the tiles are processed in the order of raster scan sc83. That is to say, in the example of FIG. 11, the tiles are processed in the order of tile 0 (t80), tile 1 (t81), tile 2 (t82), and tile 3 (t83).

Furthermore, in the example of FIG. 11, the group includes 17 CTBs, and all groups have the same number of CTBs. In this case, group 0 (s81) is located from index 0 to the third column, fourth row in the CTBs in the picture.

According to this way of thinking, the CTB column in the topmost stage of tile 1 (t81) on the top right is included in group 2 (s83). Therefore, when the display screen is displayed in the order of raster scan, at least group 0 (s81) may only be displayed after group 2 (s83) has been decoded.

When group 0 (s81) is displayed after group 2 (s83) is decoded, assuming that instantaneous decoding is performed and that the timing of drawing out group k is d(k), the output time ogt(0) of group 0 (s81) is expressed by the following formula.

$$ogt(0) = d(k) \qquad \text{Formula 12}$$

Furthermore, assuming that it takes one picture time s for decoding and the number of groups in the picture is N, the time taken to decode a group is expressed as s/N. That is to say, by using the decode time dgt of instantaneous decoding, the time dgt'(2) when decoding of group 2 is completed and the time ogt(0) when group 0 (s81) is displayed are expressed by the following formula.

$$ogt(0) = dgt'(2) = dgt(2) + s/N \qquad \text{Formula 13}$$

Here, the video image encoding device 100 reports, to the decoding device, the output delay time obtained by subtracting the output time of the group from the decode time of the previous decode picture. Accordingly, the display time is ensured at the decoding device.

Furthermore, in a post filter like a deblocking filter in HEVC disclosed in Non-patent Document 1, to display the group, there are cases where it is to be waited for a subsequent group to be decoded in order to display a group. In such a case, by appropriately setting the display delay in consideration of the decode time of the group subsequently decoded, it is possible to achieve display delay of less than one picture time.

Output Stream

In order for the video image encoding device 100 to share, with the video image decoding device, the group to which the blocks belong, the group decode delay, and the group output delay, at least the group information expressing the block belonging to each group, the group decode delay information, and the group output delay information are added to the output data stream and reported to the video image decoding device. The output data stream is also simply referred to as an "output stream".

Thus, for example, the group decode delay information adding unit 143 adds the group decode delay to the header information of the output data stream for each picture or for pictures at every predetermined interval.

Furthermore, the group output delay information adding unit 153 adds the group output delay to the header information of the output data stream for each picture or for pictures at every predetermined interval.

Furthermore, the group information adding unit 132 adds the group information to the header information of the output data stream for each picture or for pictures at every predetermined interval.

The header information may be, for example, a Sequence Header specified in MPEG-2, or a Sequence Parameter Set or Supplemental Enhancement Information specified in H.264. The decode time for each group may be added to the header information that is always attached to each picture, such as a Picture Header defined in MPEG-2 or a Slice Header defined in H.264.

If the groups are determined in a manner that each group includes the same number of blocks, the video image encoding device 100 reports to the video image decoding device that all blocks have been equally divided into an N number of groups. Accordingly, the group configuration determining unit 131 reports to the group information adding unit 132 the number of groups N as the group information.

The group information adding unit 132 encodes the group information. In MPEG-2 and H.264, encoding is performed in units of blocks of 16 pixels×16 pixels referred to as macroblocks, and this number of blocks does not usually exceed a range that may be expressed by 20 bits. The maximum value of the number of groups N is equal to the maximum value of the number of blocks, and therefore the encoding of N may be done with a fixed bit length.

Furthermore, each group does not always include the same number of blocks. In this case, the group configuration determining unit 131 reports, to the group information adding unit 132, index information of the leading block in each group as group information, together the number of groups N.

The group information adding unit 132 first encodes the number of groups N, and then sequentially encodes the index information of the leading block in each group. For example, the encoding of the index information in the first block is performed by an encoding method of a fixed bit length. Furthermore, the group information adding unit 132 may use another encoding method, including a variable length encoding method such as Huffman encoding, to encode the number of groups N and the index information in the first block in each group.

Operation

Figure 12:
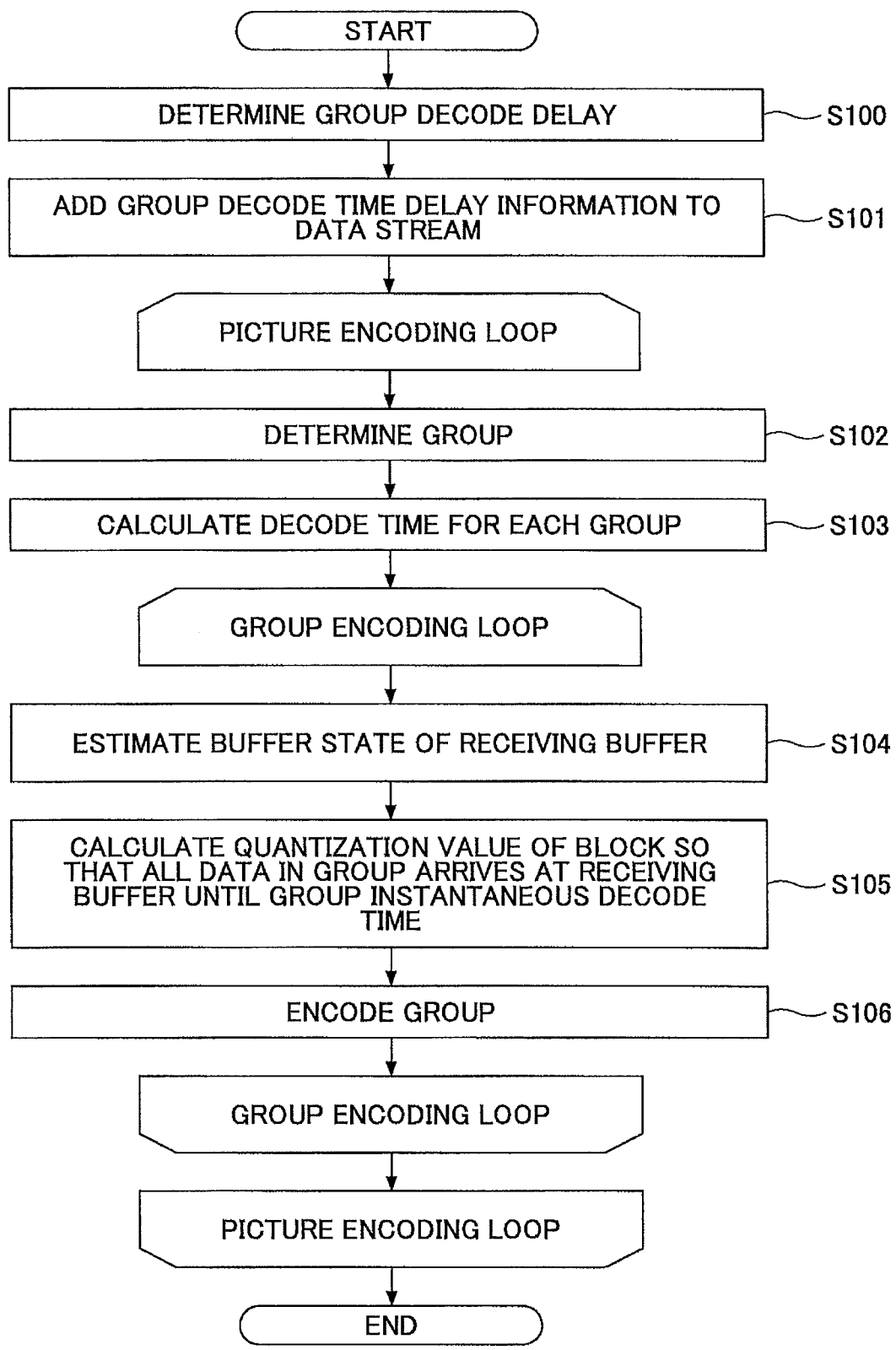
FIG. 12 is a flowchart illustrating an example of a video image encoding process according to the first embodiment.

Next, a description is given of operations of the video image encoding device 100 according to the first embodiment. FIG. 12 is a flowchart illustrating an example of a video image encoding process according to the first embodiment.

In step S100, to start the encoding operation of the sequence, first, a group decode delay Δt is determined. Δt is determined so as to be less than the time of the group at which the number of blocks included in the sequence is minimum.

In step S101, the group decode delay information adding unit 143 adds group information and group decode time delay information to the data stream.

In step S102, to start encoding each picture, the group configuration determining unit 131 first determines the groups in the picture. The number of groups and the number of blocks included in each group in each picture in the sequence may be determined for each picture. Alternatively, all pictures in the sequence may have the same number of groups, and the groups may include the same number of blocks.

In step S103, the group decode delay determining unit 142 calculates the group decode delay for each group (step S103).

In step S104, to start decoding the groups, the buffer occupancy amount calculating unit 122 estimates the buffer state of the receiving buffer in an ideal decoding device, and the upper limit of the amount of generated information of the group to be encoded next.

In step S105, the quantization value calculating unit 121 calculates the quantization value of the block so that all data in the group arrives at the receiving buffer until the earliest decode start time of the group, based on the buffer state of the receiving buffer and the upper limit of the amount of generated information of the group to be encoded next.

In step S106, the encoding process unit 110 encodes the block using the calculated quantization value.

Figure 13:
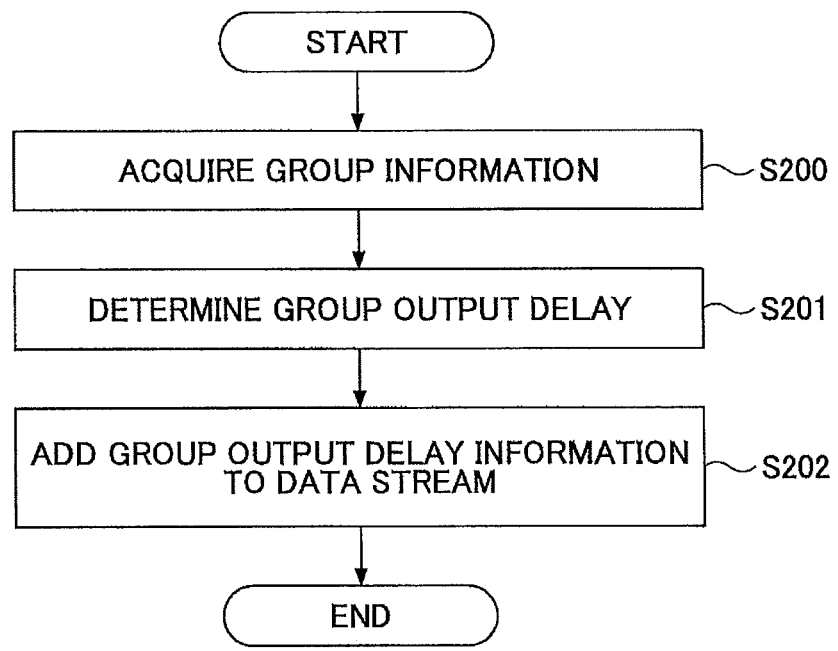
FIG. 13 is a flowchart illustrating an example of an output process according to the first embodiment.

Next, a description is given of an output process of the video image encoding device 100 according to the first embodiment. FIG. 13 is a flowchart illustrating an example of an output process according to the first embodiment.

In step S200, the output time determining unit 150 extracts group information from the data stream.

In step S201, the group output delay determining unit 152 determines the group output delay information. The group output delay information may be determined as described above.

In step S202, the group output delay information adding unit 153 adds the group output delay information to the data stream.

According to the first embodiment, when realizing codec delay of less than one picture time, the decoding or the output of the group is accelerated, so that lower delay is realized.

Second Embodiment

Next, a description is given of a video image decoding device according to a second embodiment. In the second embodiment, the stream that is encoded in the video image encoding device 100 according to the first embodiment is appropriately decoded.

Configuration

Figure 14:
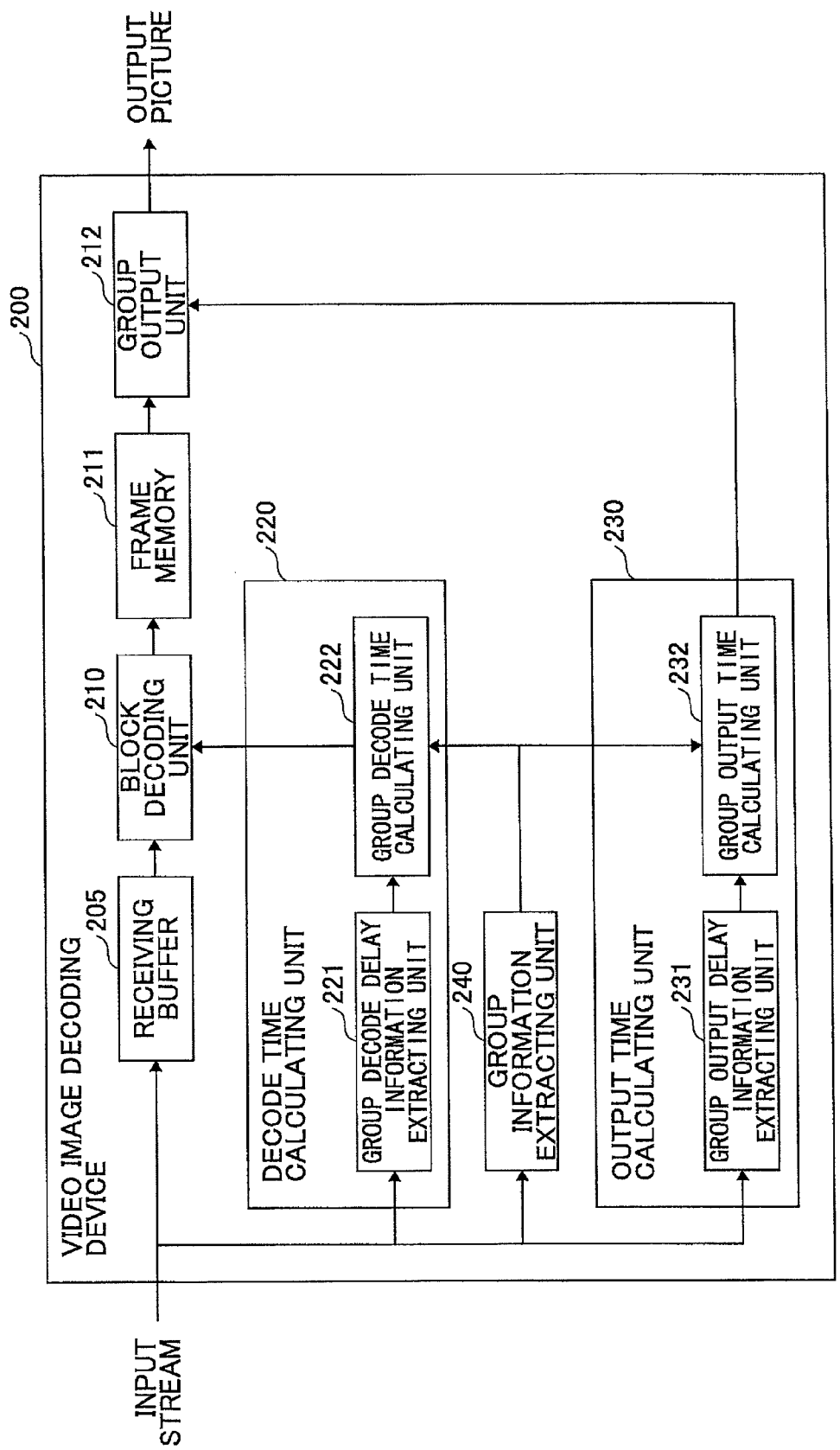
FIG. 14 is a block diagram illustrating a schematic configuration of a video image decoding device according to a second embodiment.

FIG. 14 is a block diagram illustrating a schematic configuration of a video image decoding device 200 according to the second embodiment. The video image decoding device 200 includes a receiving buffer 205, a block decoding unit 210, a frame memory 211, a group output unit 212, a decode time calculating unit 220, an output time calculating unit 230, and a group information extracting unit 240.

The group information extracting unit 240 extracts, from the input stream, group information indicating groups obtained by dividing the blocks at predetermined intervals.

The decode time calculating unit 220 includes a group decode delay information extracting unit 221 and a group decode time calculating unit 222.

The output time calculating unit 230 includes a group output delay information extracting unit 231 and a group output time calculating unit 232.

The units included in the video image decoding device 200 are mounted in video image decoding device 200 as separate circuits. Alternatively, the units included in the video image decoding device 200 may be mounted in the video image decoding device 200 as a single integrated circuit in which circuits implementing the functions of the units are integrated. Alternatively, the units included in the video image decoding device 200 may be functional modules realized by computer programs executed in a processor included in the video image decoding device 200.

The receiving buffer 205 receives a stream sent by the video image encoding device 100, and performs buffering.

The block decoding unit 210 acquires data from the receiving buffer 205 at a decode start time of a group output from the group decode time calculating unit 222, performs a decoding process starting from the leading block, and sequentially outputs the decoded blocks. The decode start time is also simply referred to as a "decode time".

The frame memory 211 saves the decoded blocks output from the block decoding unit 210. The frame memory 211 functions as a decoding buffer in which the output target groups are buffered before being output. The decoding buffer may have a different configuration from that of the frame memory 211.

The group output unit 212 outputs a group at a group output time output from the group output time calculating unit 232.

The group decode delay information extracting unit 221 extracts group decode delay information from an input stream that is encoded data.

The group decode time calculating unit 222 calculates the decode start time of each group based on group information output from the group information extracting unit 240 and group decode delay information output from the group decode delay information extracting unit 221.

The group decode time calculating unit 222 calculates the decode start time dtb(i) of the leading block in the "i" th picture P(i) by the following formula.

$$dtb(i)=dt(i-1)+\Delta t \qquad \text{Formula 14}$$

The group output delay information extracting unit 231 extracts group output delay information from the input stream that is encoded data.

The group output time calculating unit 232 calculates the output time of each group based on group information output from the group information extracting unit 240 and group output delay information output from the group decode delay information extracting unit 221.

The video image decoding device 200 calculates the decode start time of each decode group based on the number of groups N and decode delay information of the groups that have been reported. Furthermore, the video image decoding device 200 calculates the output time of each decode group based on the number of groups N and output delay information of the groups that have been reported.

Operation

Figure 15:
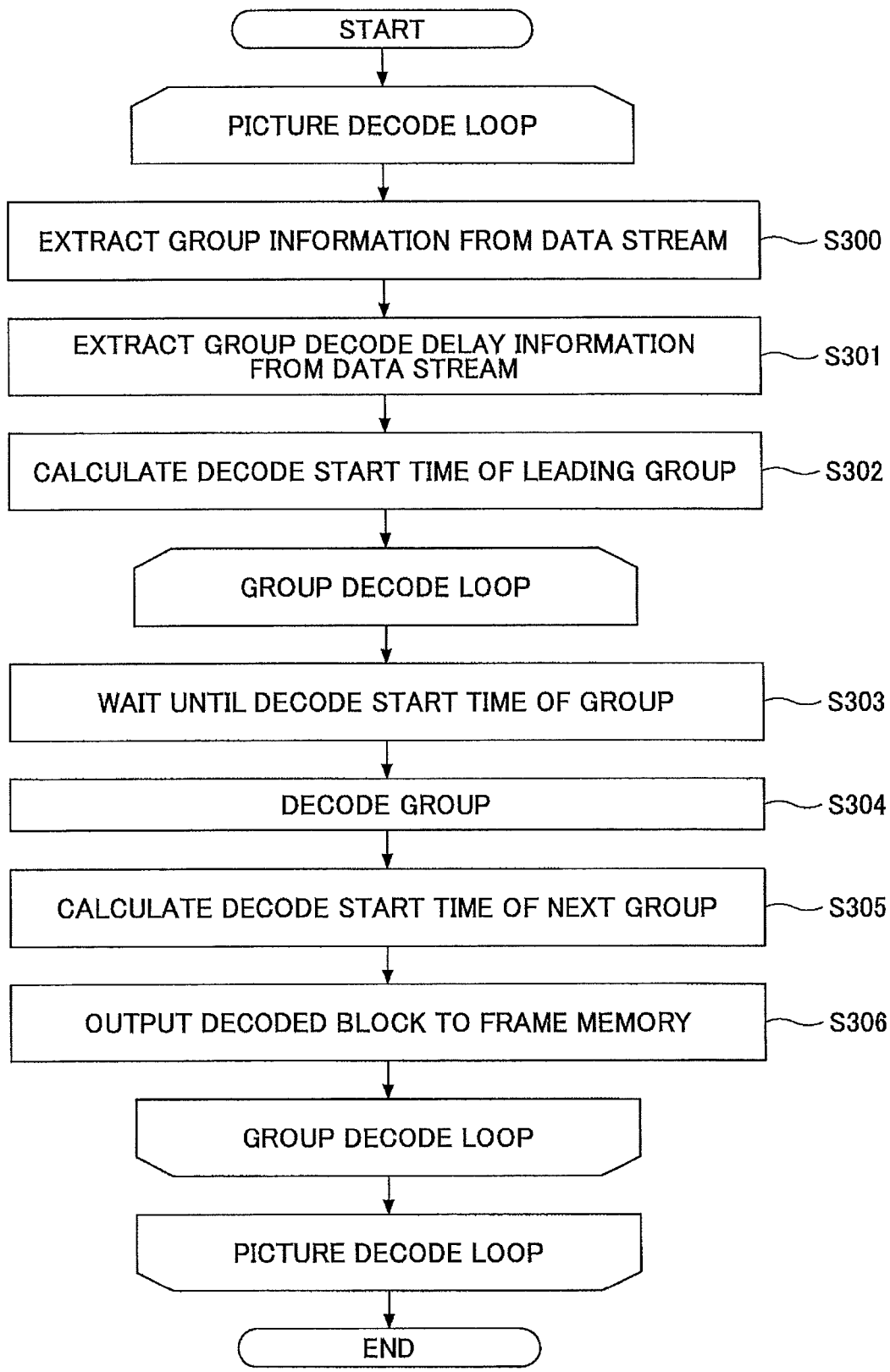
FIG. 15 is a flowchart illustrating an example of a video image decoding process according to the second embodiment.

Next, a description is given of operations of the video image decoding device 200 according to the second embodiment. FIG. 15 is a flowchart illustrating an example of a video image decoding process according to the second embodiment. In step S300 of FIG. 15, to start the decoding of each picture, first, the group information extracting unit 240 extracts group information from the data stream.

In step S301, the group decode delay information extracting unit 221 extracts group decode delay information from the data stream.

In step S302, the group decode time calculating unit 222 calculates the decode start time of the leading group.

The number of decode groups and the number of blocks included in each decode group in each picture in the sequence may be determined for each picture. Alternatively, all pictures in the sequence may have the same number of decode groups, and the decode groups may include the same number of blocks. Furthermore, the decode groups may be the same as the groups described in the block decode time information.

In step S303, the block decoding unit 210 waits until the decode time of the group, in the group decode loop.

In step S304, the block decoding unit 210 acquires data from the receiving buffer 205, and decodes each block.

In step S305, the group decode time calculating unit 222 calculates the decode start time of the next group.

In step S306, the block decoding unit 210 outputs the decoded decode block to the frame memory 211.

Figure 16:
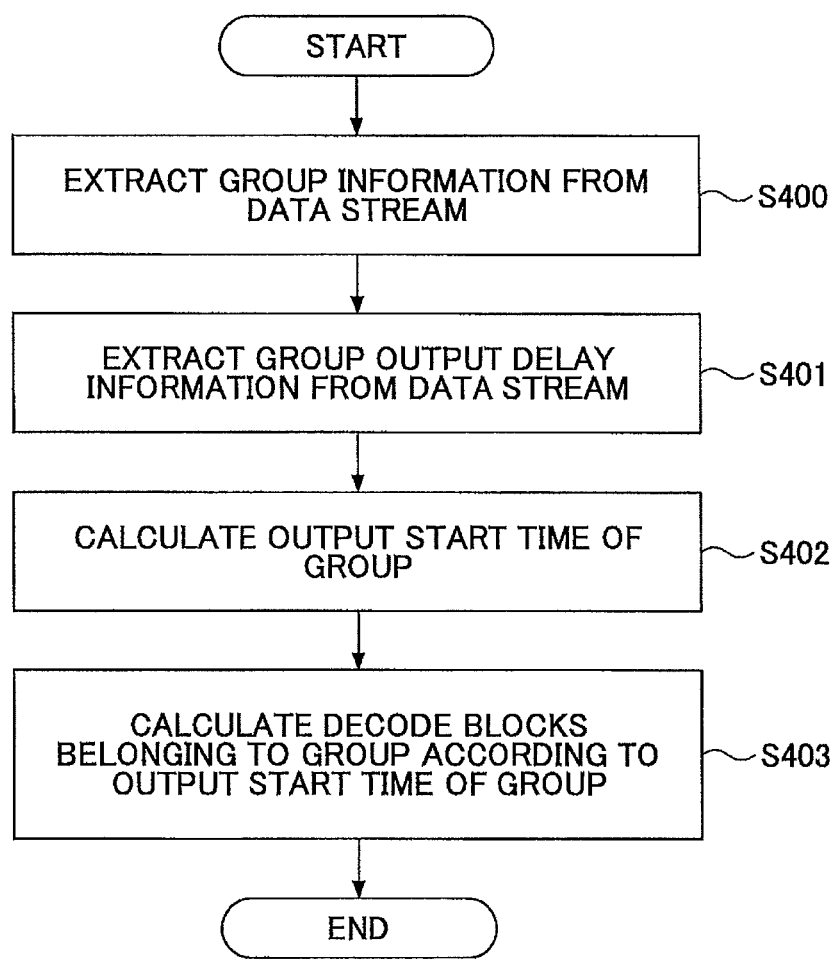
FIG. 16 is a flowchart illustrating an example of an output process according to the second embodiment.

Next, a description is given of an output process of the video image decoding device 200 according to the second embodiment. FIG. 16 is a flowchart illustrating an example of an output process according to the second embodiment.

In step S400, first, to start decoding the pictures, the group decode delay information extracting unit 221 extracts group output delay information from the data stream.

In step S401, next, the group decode time calculating unit 222 calculates the output start time of the leading group in P(i) based on the group output delay information.

In step S402, the group output time calculating unit 232 calculates the output start time of the group.

In step S403, the block decoding unit 210 calculates the decode blocks belonging to the group according to the output start time of the group.

According to the second embodiment, the stream encoded by the video image encoding device 100 according to the first embodiment is appropriately decoded.

Third Embodiment

Next, a description is given of a video image encoding device according to a third embodiment. In the third embodiment, processes to be performed when underflow occurs in units of groups are defined.

Configuration

Figure 17:
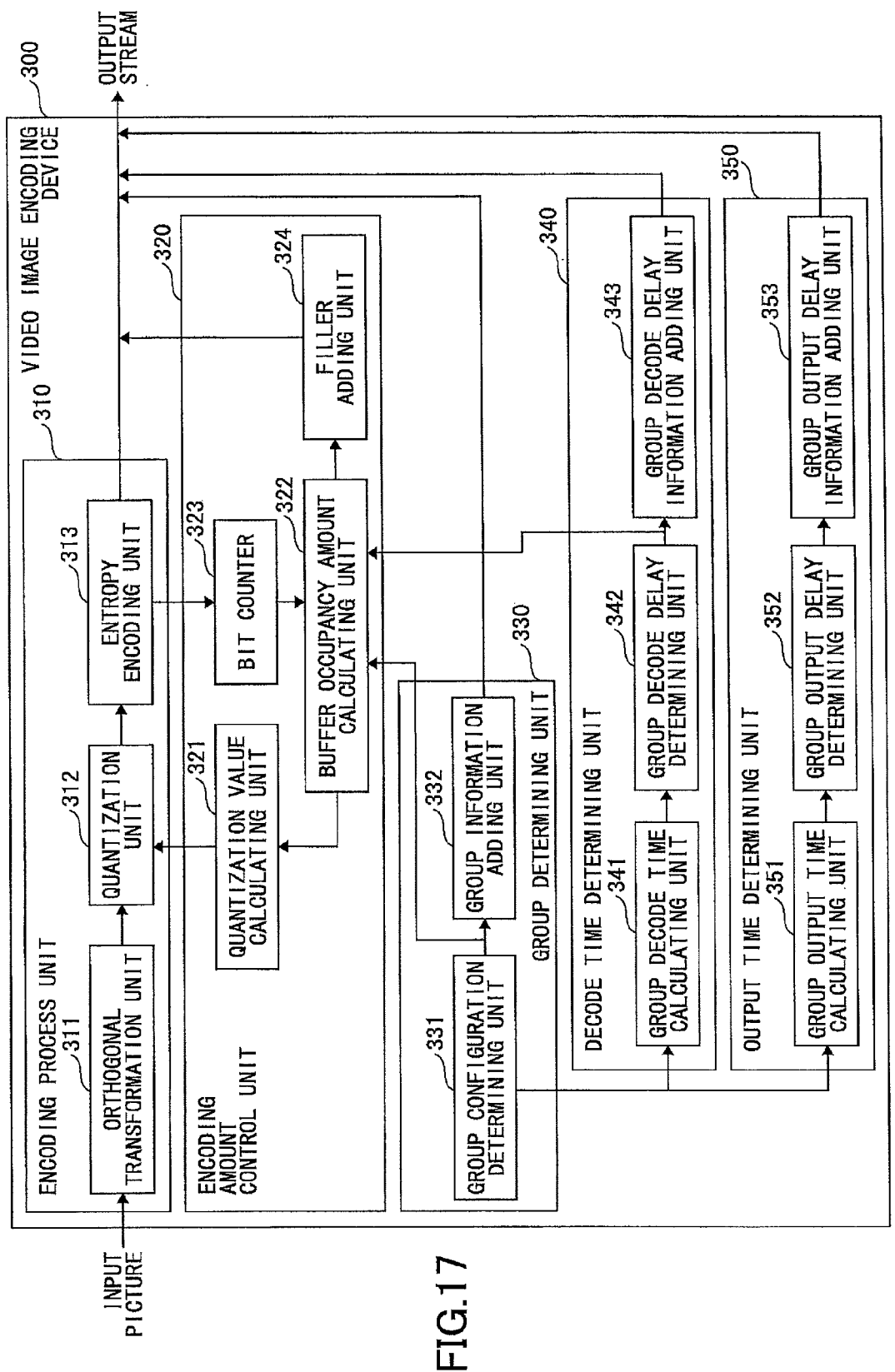
FIG. 17 is a block diagram illustrating a schematic configuration of a video image encoding device according to a third embodiment.

FIG. 17 is a block diagram illustrating a schematic configuration of a video image encoding device 300 according to the third embodiment. The video image encoding device 300 includes an encoding process unit 310, an encoding amount control unit 320, a group determining unit 330, a decode time determining unit 340, and an output time determining unit 350. The encoding process unit 310 includes an orthogonal transformation unit 311, a quantization unit 312, and an entropy encoding unit 313. The group determining unit 330 includes a group configuration determining unit 331 and a group information adding unit 332. The decode time determining unit 340 includes a group decode time calculating unit 341, a group decode delay determining unit 342, and a group decode delay information adding unit 343. The output time determining unit 350 includes a group output time calculating unit 351, a group output delay determining unit 352, and a group output delay information adding unit 353.

The encoding process unit 310, the group determining unit 330, the decode time determining unit 340, and the output time determining unit 350 perform the same processes as the encoding process unit 110, the group determining unit 130, the decode time determining unit 140, and the output time determining unit 150 illustrated in FIG. 7, respectively.

The encoding amount control unit 320 includes a quantization value calculating unit 321, a buffer occupancy amount calculating unit 322, a bit counter 323, and a filler adding unit 324.

The encoding amount control unit 320 controls the encoding amount in a case when data used for decoding all blocks included in a group is transmitted to the decoding device by a predetermined transmission rate, so that the data arrives at a receiving buffer of the decoding device by a time expressed by a determined display time.

The quantization value calculating unit 321 and the bit counter 323 perform the same processes as the quantization value calculating unit 121 and the bit counter 123 illustrated in FIG. 7, respectively.

In addition to operations by the buffer occupancy amount calculating unit 122 illustrated in FIG. 7, the buffer occupancy amount calculating unit 322 checks whether a buffer underflow state occurs, where the amount of generated information of the group exceeds the target value and all data in the group does not arrive at the receiving buffer of the ideal decoding device until the decode start time.

When a buffer underflow state is detected, the buffer occupancy amount calculating unit 322 instructs the filler adding unit 324 to insert dummy data at the end of the processed picture, and reports the buffer underflow state to an overall control unit (not illustrated). When the overall control unit (not illustrated) receives the report of a buffer underflow state, the overall control unit implements control to skip the encoding process on the next picture to be encoded.

The filler adding unit 324 inserts dummy data at the end of the processed picture. The amount of dummy data to be inserted is instructed from the buffer occupancy amount calculating unit 322.

The filler adding unit 324 adds filler data to the output stream when the data used for decoding all blocks included in the group does not arrive at the receiving buffer of the decoding device by the display time. Furthermore, by adding the filler data, the filler adding unit 324 implements control so that data used for decoding the last block in the picture including the group does not arrive at the receiving buffer of the decoding device by the display time.

Process when Underflow Occurs

Figure 18:
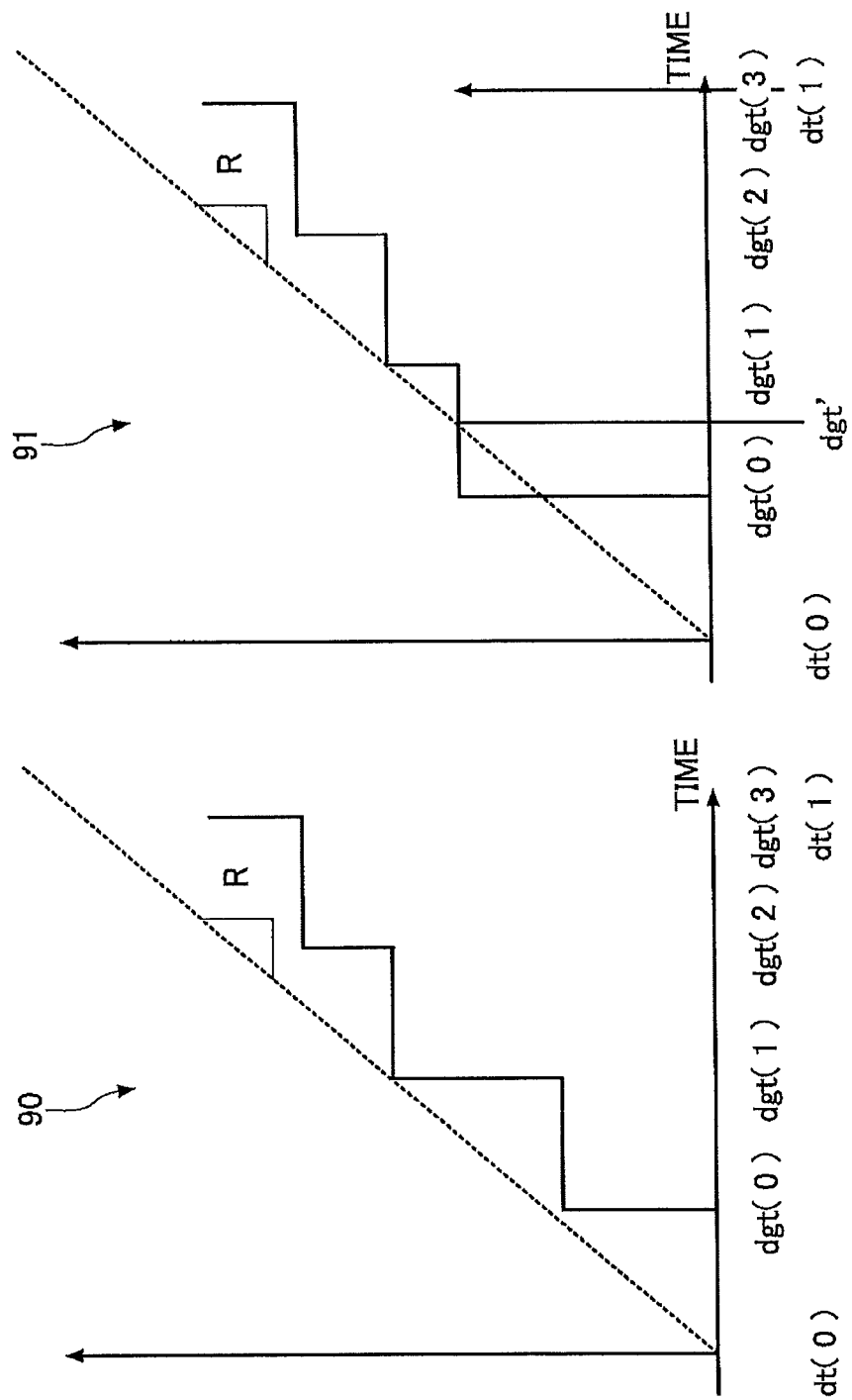
FIG. 18 is for describing the occurrence of underflow.

With reference to FIG. 18, a case where underflow occurs in a group in a picture is considered. FIG. 18 is for describing the occurrence of underflow. As indicated by a graph 90 in FIG. 18, basically, when a decode time is defined in units of groups, the encoding device adjusts the encoding amount so that decoding is performed at a decode time that is scheduled according to information sent to the decoding device by additional information such as an SEI message.

However, as indicated by a graph 91 in FIG. 18, when underflow occurs at the group at dgt (0), decoding is not performed until bits used for decoding are received at the buffer, similar to the above.

It is to be noted that display of one picture is to be ensured, and when underflow occurs in a group, the display is to be delayed by one picture. The reason is for waiting until the bits used for decoding one group are received at the buffer, when underflow occurs in a group. The next decode timing is dgt' indicated in the line graph 91 of FIG. 18.

In this case, the subsequent decode time is delayed correspondingly. Therefore, even if the time dt(0) when the picture to which the group belongs is decoded and displayed approaches, decoding of all groups is not completed. Therefore, the display of one picture is delayed.

A case where underflow occurs in a group but underflow does not occur for the picture is considered. Underflow has occurred in units of groups. Therefore, group decoding is to be delayed, the display for one picture is to be delayed, and the next picture is to be skipped.

However, underflow has not occurred in units of pictures, so an attempt is made to display the picture at a regular timing, which is a contradictory state. In this case, the decoding of the group is delayed, and therefore the decoding of the picture is not completed at the regular timing for displaying the picture. Thus, it is not possible to output a proper picture.

Furthermore, at the timing for displaying the next picture, the decoding for the next picture is not completed. Thus, it is not possible to output a proper picture. Accordingly, decoding is not performed to output proper pictures at the timings for displaying the pictures.

Figure 19:
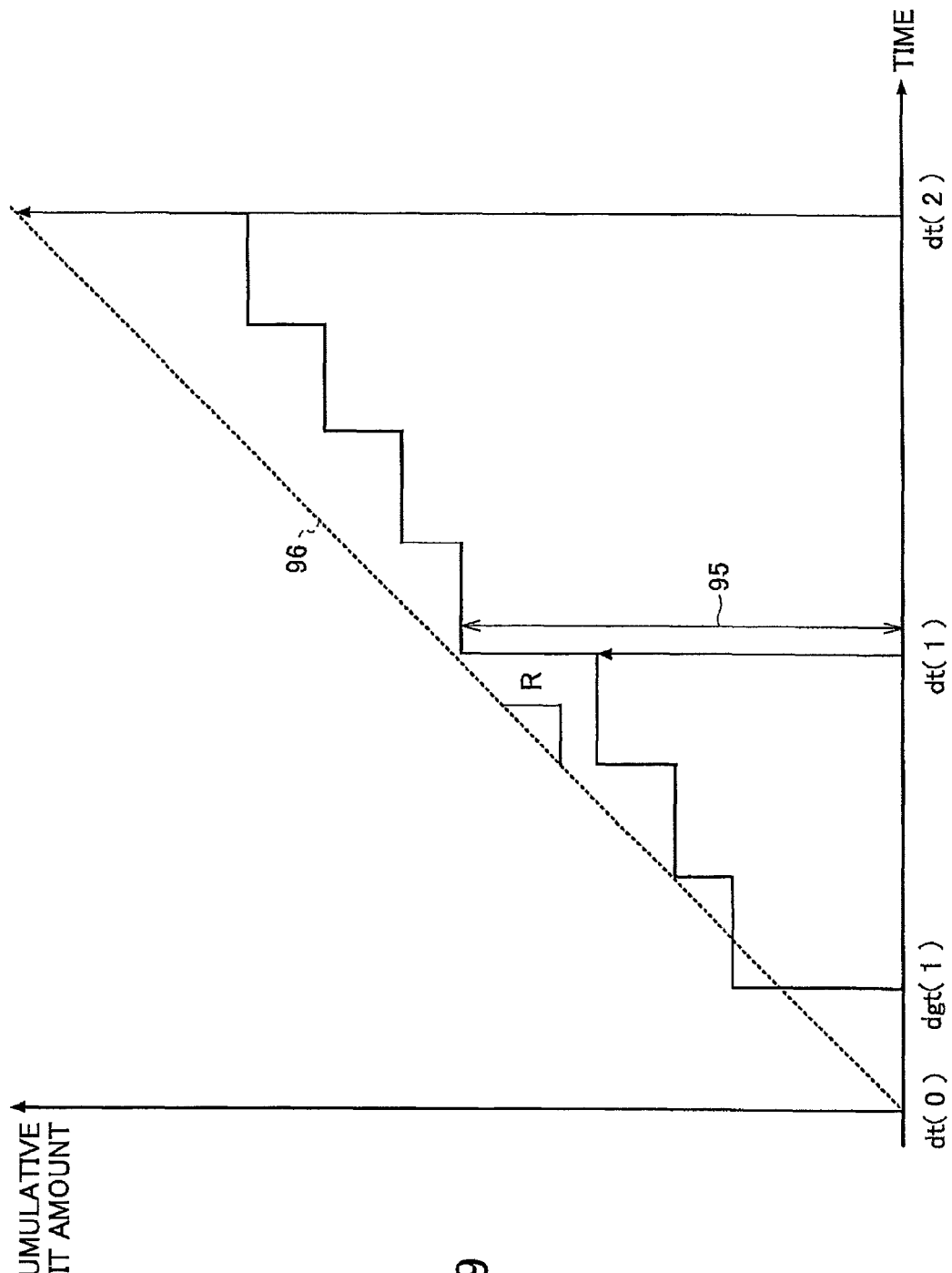
FIG. 19 is for describing a process performed when underflow occurs.

Thus, as illustrated in FIG. 19, when underflow occurs in a group, it is assumed that underflow has also occurred for the picture, and it is defined to delay display of one picture and to skip the picture to be displayed next. Accordingly, the next picture is skipped, and therefore the display time is properly corrected.

FIG. 19 is for describing a process performed when underflow occurs. In the example of FIG. 19, it is assumed that when underflow occurs at dgt(1), underflow occurs at dt(1) even though the amount of pictures indicated by a reference numeral 95 to be decoded at dt(1) is smaller than that of a encoding stream arriving rate 96. Accordingly, display of one picture is delayed, and the picture that is supposed to be displayed at dt(1) is displayed at dt(2), and the picture that is supposed to be displayed at dt(2) is skipped.

Furthermore, at the encoding device, when underflow occurs in a group, filler data is inserted in the encoded data of the picture. Accordingly, underflow is purposely caused so that the next picture is skipped, and therefore the display time is properly corrected.

Underflow Detection, Picture Information Amount Control

A description is given of a method of detecting underflow and a method of editing a bit stream performed by a video image encoding device according to the third embodiment.

First, the encoding amount control unit 320 performs the same operation as that of the first embodiment. Underflow is detected by the buffer occupancy amount calculating unit 322. In this case, when the condition (2) is not satisfied in at least one of the groups, the buffer occupancy amount calculating unit 322 detects that underflow has occurred in a group included in the picture.

At this time, the buffer occupancy amount calculating unit 322 reports underflow occurrence information to the filler adding unit 324. When the filler adding unit 324 receives the underflow occurrence information and confirms that underflow has occurred, the filler adding unit 324 performs a process of skipping the display of a picture.

For example, by attaching filler data to the output stream, underflow is purposely caused in units of pictures, and the display of a picture is skipped. The method of attaching filler data is easily analogized, and is thus not further described.

By performing the above process, display of a picture is skipped, so that the order in displaying pictures is not changed.

Operation

Figure 20:
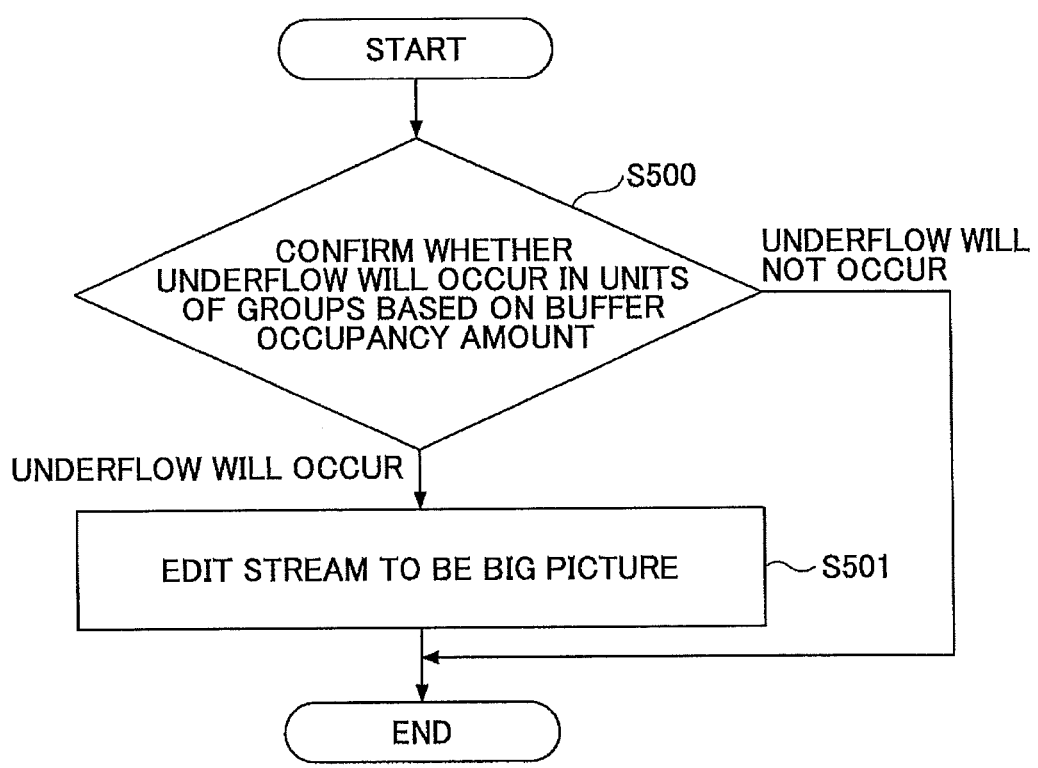
FIG. 20 is a flowchart illustrating an example of a process of the video image encoding device according to the third embodiment.

Next, a description is given of operations of the video image encoding device 300 according to the third embodiment. FIG. 20 is a flowchart illustrating an example of a process of the video image encoding device 300 according to the third embodiment.

In step S500, the buffer occupancy amount calculating unit 322 confirms whether underflow will occur in units of groups based on the buffer occupancy amount of the receiving buffer of the decoding device.

In step S501, when the buffer occupancy amount calculating unit 322 determines that underflow will occur in units of groups, the buffer occupancy amount calculating unit 322 instructs the filler adding unit 324 to edit the output stream so that underflow also occurs in units of pictures. The filler adding unit 324 edits the output stream to skip the display of a picture. The picture in which underflow has occurred is also referred to as a big picture.

According to the third embodiment, when underflow occurs in units of groups, an appropriate process is performed.

Fourth Embodiment

Next, a description is given of a video image decoding device according to a fourth embodiment. In the fourth embodiment, the encoded data that is encoded by the video image encoding device according to the third embodiment is appropriately decoded.

Configuration

Figure 21:
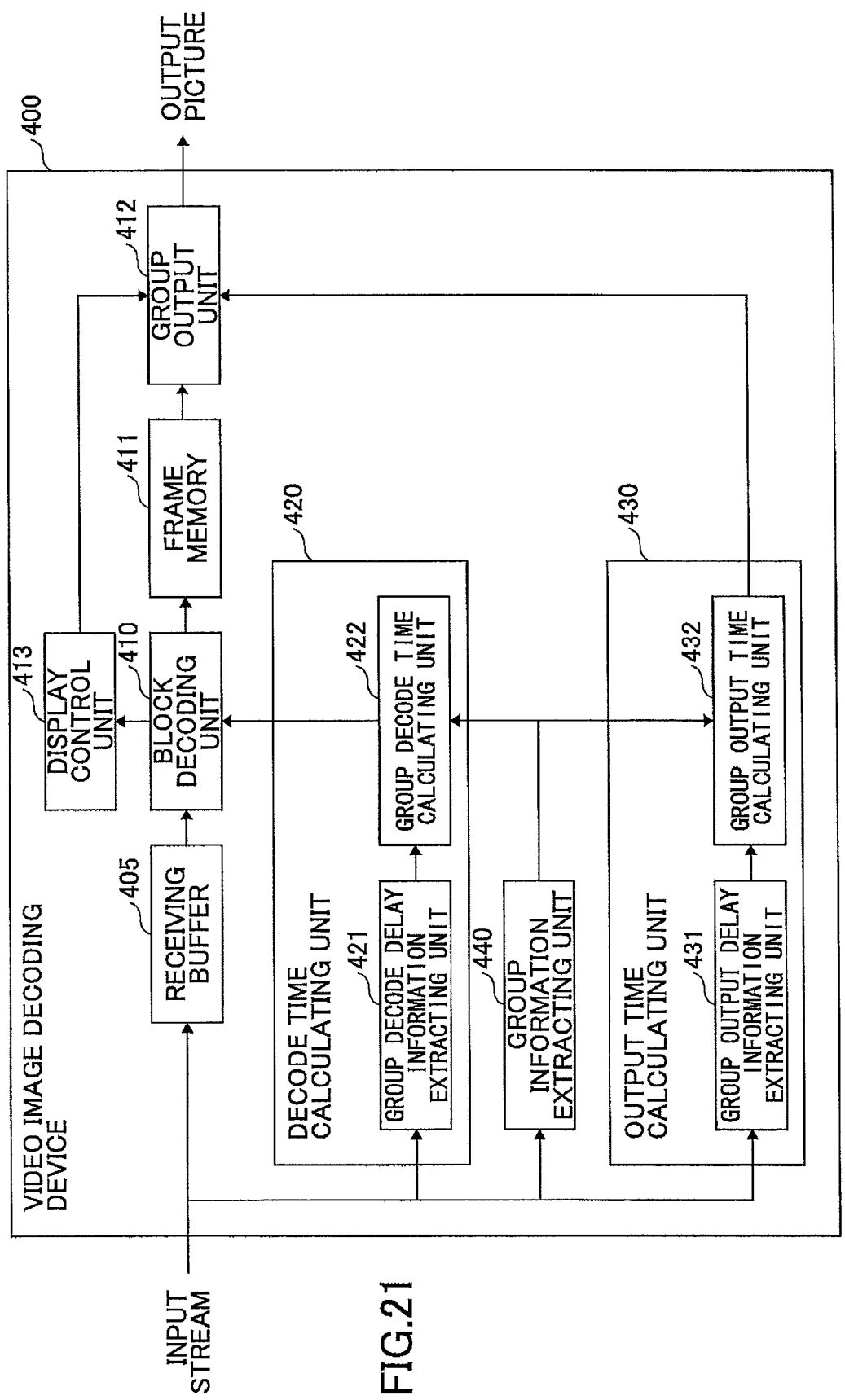
FIG. 21 is a block diagram illustrating a schematic configuration of a video image decoding device according to a fourth embodiment.

FIG. 21 is a block diagram illustrating a schematic configuration of a video image decoding device 400 according to the fourth embodiment. The video image decoding device 400 includes a receiving buffer 405, a decode time calculating unit 420, an output time calculating unit 430, a group decode delay information extracting unit 421, a group output delay information extracting unit 431, a group decode time calculating unit 422, a group output time calculating unit 432, a group information extracting unit 440, a block decoding unit 410, a frame memory 411, a group output unit 412, and a display control unit 413.

The units included in the video image decoding device 400 are mounted in the video image decoding device 400 as separate circuits.

Alternatively, the units included in the video image decoding device 400 may be mounted in the video image decoding device 400 as a single integrated circuit in which circuits implementing the functions of the units are integrated. Alternatively, the units included in the video image decoding device 400 may be functional modules realized by computer programs executed in a processor included in the video image decoding device 400.

Underflow Detection, Stream Editing

A description is given of a method of detecting underflow and a method of editing a bit stream performed by the video image decoding device 400 according to the fourth embodiment.

First, the block decoding unit 410 performs the same operation as that of the first embodiment. Underflow is detected by the block decoding unit 410. The block decoding unit 410 receives bit amount information from an entropy decoding unit (not illustrated).

In this case, when the condition (2) is not satisfied in at least one of the groups, the block decoding unit 410 detects that underflow has occurred in a group included in the picture. For example, the graph 91 in FIG. 18 indicates that underflow has occurred at dgt(1).

At this time, the block decoding unit 410 reports underflow occurrence information to the display control unit 413. When the display control unit 413 receives the underflow occurrence information and confirms that underflow has occurred, the display control unit 413 performs a process of skipping the display of a picture.

That is to say, when underflow occurs in a group dgt(1) in the picture having a decode time of dt(k), even if a bit amount that may be decoded as a picture is accumulated in the buffer at dt(k), the picture of dt(k) is displayed at dt(k+1). The picture that is supposed to be displayed at dt(k+1) is skipped.

In the example of FIG. 19, the picture supposed to be displayed at dt(1) is displayed at dt(2), and the picture supposed to be displayed at dt(2) is skipped. In this example, it is assumed that the decoding is performed instantaneously, and that output (display) is performed at the same time as the decoding.

By performing the above process, display of a picture is skipped, so that the order in displaying pictures is not changed.

Operation

Figure 22:
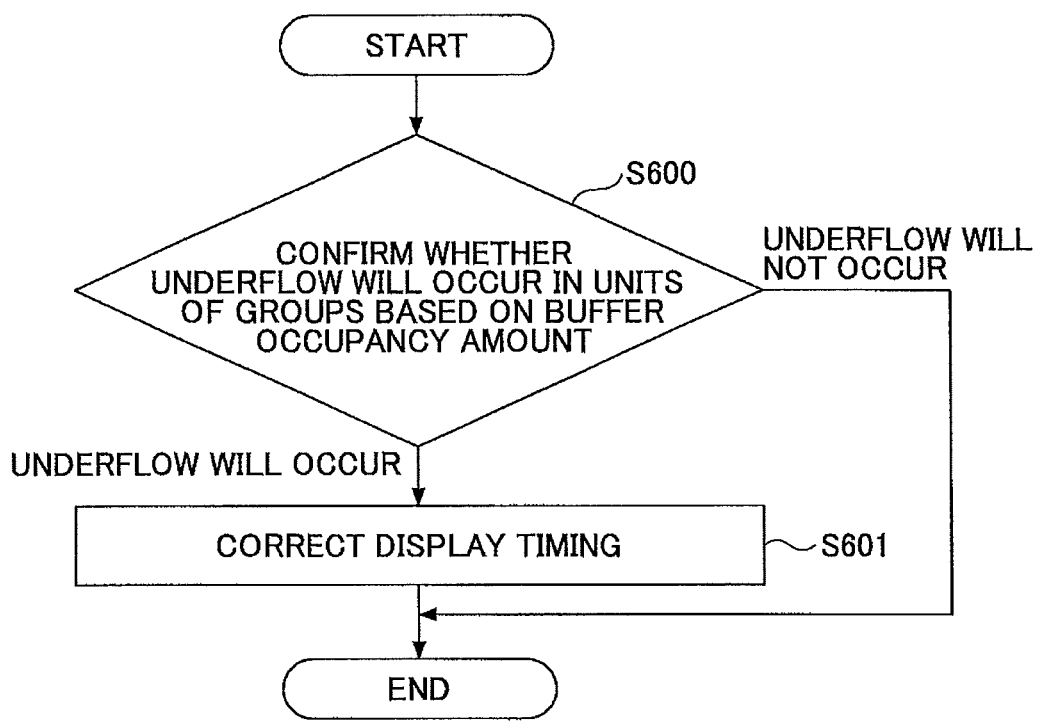
FIG. 22 is a flowchart illustrating an example of a process of the video image decoding device according to the fourth embodiment.

Next, a description is given of operations of the video image decoding device 400 according to the fourth embodiment. FIG. 22 is a flowchart illustrating an example of a process of the video image decoding device 400 according to the fourth embodiment.

In step S600, the block decoding unit 410 confirms whether underflow will occur in units of groups based on the buffer occupancy amount of the receiving buffer 405.

In step S601, when the block decoding unit 410 determines that underflow will occur in units of groups, the block decoding unit 410 reports underflow generation information to the display control unit 413. When the underflow generation information is reported, the display control unit 413 corrects the timing of displaying the picture.

According to the fourth embodiment, the encoded data encoded by the video image encoding device 300 according to the third embodiment is appropriately decoded.

Fifth Embodiment

Figure 23:
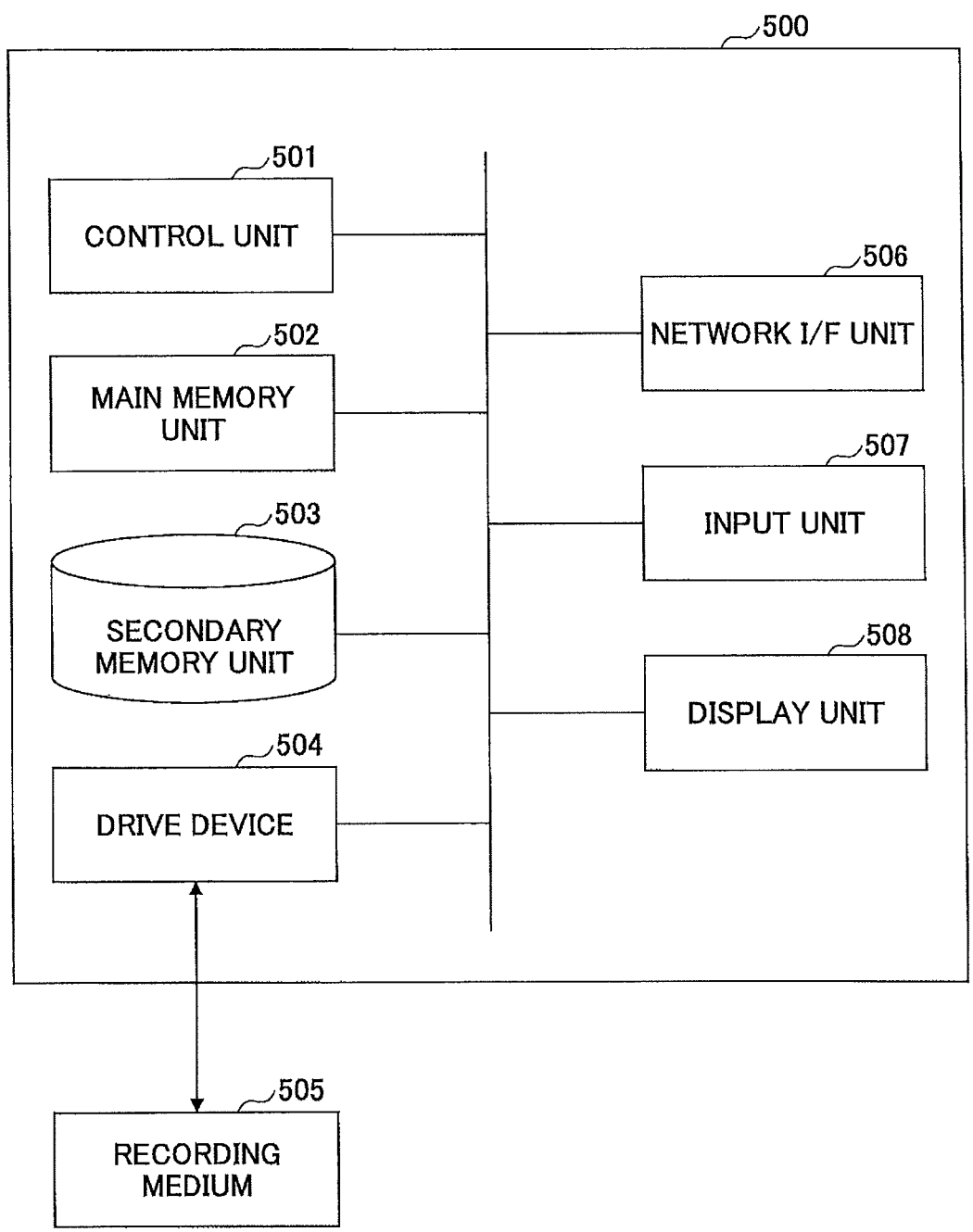
FIG. 23 is a block diagram of an example of a video image processing device according to a fifth embodiment.

FIG. 23 is a block diagram of an example of a video image processing device 500 according to a fifth embodiment. A video image processing device 500 is an example of the video image encoding devices or the video image decoding devices described in the respective embodiments. As illustrated in FIG. 23, the video image processing device 500 includes a control unit 501, a main memory unit 502, a secondary memory unit 503, a drive device 504, a network I/F unit 506, an input unit 507, and a display unit 508. These units are connected via a bus so that it is possible to exchange data among each other.

The control unit 501 controls the respective devices and performs calculation and processing on data in the computer. Furthermore, the control unit 501 is a processor for executing programs stored in the main memory unit 502 and secondary memory unit 503, receiving data from the input unit 507 and the storage device, performing calculations and processing on the data, and outputting the data to the display unit 508 and the storage device.

The main memory unit 502 is, for example, a ROM (Read-Only Memory) or a RAM (Random Access Memory), and is a storage device for storing or temporarily saving the OS that is the basic software and programs such as application software executed by the control unit 501, and data.

The secondary memory unit 503 is, for example, a HDD (Hard Disk Drive), which is a storage device for storing data relevant to application software.

The drive device 504 is for reading a program from a recording medium 505 such as a flexible disk, and installing the program in the storage device.

The recording medium 505 stores a predetermined program. The program stored in the recording medium 505 is installed in the video image processing device 500 via the drive device 504. The installed predetermined program may be executed by the video image processing device 500.

The network I/F unit 506 is an interface between the video image processing device 500 and peripheral devices having communication functions connected via a network such as a LAN (Local Area Network) and a WAN (Wide Area Network) constructed by a wired and/or wireless data transmission path.

The input unit 507 includes a curser key, a keyboard including keys for inputting numbers and various functions, and a mouse and a slice pad for selecting a key on the display screen of the display unit 508. Furthermore, the input unit 507 is a user interface used by the user for giving operation instructions to the control unit 501 and inputting data.

The display unit 508 includes a LCD (Liquid Crystal Display), and displays information according to display data input from the control unit 501. The display unit 508 may be provided outside, in which case the video image processing device 500 has a display control unit.

Accordingly, the video image encoding process or the video image decoding process described in the above embodiments may be implemented as a program to be executed by a computer. By installing this program from a server and causing a computer to execute this program, it is possible to implement the above-described video image encoding process or the video image decoding process.

Furthermore, the video image encoding program or the video image decoding program may be recorded in the recording medium 505, and cause a computer or a mobile terminal to read the recording medium 505 recording this program to implement the above-described video image encoding process or the video image decoding process.

The recording medium 505 may be various types of recording media such as a recording medium for optically, electrically, or magnetically recording information, for example, a CD-ROM, a flexible disk, and a magnet-optical disk, or a semiconductor memory for electrically recording information, for example, a ROM and a flash memory. The recording medium 505 does not include carrier waves.

A program executed by the video image processing device 500 has a module configuration including the respective units described in the above embodiments. As the actual hardware, the control unit 501 reads a program from the secondary memory unit 503 and executes the program to load one or more of the above described units in the main memory unit 502, so that one or more the units are generated in the main memory unit 502.

Furthermore, the video image encoding process described in the above embodiments may be mounted in one or more integrated circuits.

The video image encoding device according to the above embodiments may be used for various purposes. For example, the video image encoding device or the video image decoding device may be built in a video camera, an image transmitting device, an image receiving device, a videotelephony system, a computer, or a mobile phone.

According to an aspect of the embodiments, when realizing codec delay of less than one picture time, lower delay is realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The present invention is not limited to the specific embodiments described herein, and variations and modifications may be made without departing from the scope of the present invention. All or a plurality of configuration elements in the above embodiments may be combined.

What is claimed is:

1. A video image encoding device comprising:
    a group configuration determination unit configured to determine a group to which each of a plurality of blocks belongs, the plurality of blocks being obtained by dividing each picture included in video image data;
    a group information addition unit configured to add, to an output stream, group information expressing the group to which each of the plurality of blocks belongs;
    a group output time calculation unit configured to calculate an output time for each of the groups;
    a group output delay determination unit configured to determine output delay for each of the groups;
    a group output delay information addition unit configured to add, to the output stream, an output delay time from a decode time of each of the groups;
    an encode amount control unit configured to control an encode amount so that data used for outputting all of the blocks included in one of the groups arrives at a decoding buffer of a decoding device and decoding is completed by the output time expressed by the output delay time; and
    an encoding process unit configured to perform encoding based on control information of the encode amount control unit.

2. A method executed by a computer, the method comprising:
    determining a group to which each of a plurality of blocks belongs, the plurality of blocks being obtained by dividing each picture included in video image data;
    adding, to an output stream, group information expressing the group to which each of the plurality of blocks belongs;
    calculating an output time for each of the groups;
    determining output delay for each of the groups;
    adding, to the output stream, an output delay time from a decode time of each of the groups;
    controlling an encode amount so that data used for outputting all of the blocks included in one of the groups arrives at a decoding buffer of a decoding device and decoding is completed by the output time expressed by the output delay time; and
    performing encoding based on the encode amount that has been controlled.

* * * * *